US012474297B2

(12) United States Patent
Kimura et al.

(10) Patent No.: US 12,474,297 B2

(45) Date of Patent: Nov. 18, 2025

(54) METHOD FOR TRAPPING MICROPARTICLE AND MICROPARTICLE TRAPPING DEVICE

(71) Applicant: HAMAMATSU PHOTONICS K.K., Hamamatsu (JP)

(72) Inventors: Yuji Kimura, Hamamatsu (JP); Kazuya Suzuki, Hamamatsu (JP); Ryo Makino, Hamamatsu (JP); Hiroyasu Itoh, Hamamatsu (JP)

(73) Assignee: HAMAMATSU PHOTONICS K.K., Hamamatsu (JP)

(*) Notice: Subject to any disclaimer, the term of this patent is extended or adjusted under 35 U.S.C. 154(b) by 741 days.

(21) Appl. No.: 17/547,377

(22) Filed: Dec. 10, 2021

(65) Prior Publication Data

US 2022/0187240 A1 Jun. 16, 2022

(30) Foreign Application Priority Data

Dec. 14, 2020 (JP) ................................ 2020-206935

(51) Int. Cl.

*B03C 5/00* (2006.01)
*B03C 5/02* (2006.01)
*G01N 21/64* (2006.01)
*G01N 27/447* (2006.01)

(52) U.S. Cl.

CPC ....... *G01N 27/44721* (2013.01); *B03C 5/005* (2013.01); *B03C 5/022* (2013.01); *G01N 21/64* (2013.01); *G01N 2021/6495* (2013.01)

(58) Field of Classification Search

CPC ............. G01N 27/44721; G01N 21/64; G01N 2021/6495; G01N 15/01; G01N 2015/1006; G01N 15/1484; G01N 15/1456; B03C 5/005; B03C 5/022; B03C 2201/26; B03C 5/026

See application file for complete search history.

(56) References Cited

U.S. PATENT DOCUMENTS 6,537,433 B1 * 3/2003 Bryning ........... G01N 27/44791 204/600
11,090,660 B2 * 8/2021 Hayes ................ G01N 15/1484

(Continued)

FOREIGN PATENT DOCUMENTS

JP S61-219386 A 9/1986
JP S63-181992 A 7/1988

(Continued)

*Primary Examiner* — David P Porta
*Assistant Examiner* — Mamadou Faye
(74) *Attorney, Agent, or Firm* — Faegre Drinker Biddle & Reath LLP

(57) ABSTRACT

A microparticle trapping device includes: a fluid channel configured to be injected with a fluid including a microparticle; first and second electrodes configured to generate an electric field in the fluid channel; and an electrical insulator formed with at least one opening between the first and second electrodes in the fluid channel. The electrical insulator is disposed between the first and second electrodes so that an inhomogeneous electric field is made through the at least one opening between the first and second electrodes in the fluid channel, and the still other aspect is configured to trap the microparticle through dielectrophoresis.

8 Claims, 18 Drawing Sheets

(56) References Cited

U.S. PATENT DOCUMENTS

| | | | | |
|---|---|---|---|---|
| 2006/0281168 | A1* | 12/2006 | Futami | C12M 35/02 435/450 |
| 2014/0131204 | A1 | 5/2014 | Chou et al. | |
| 2019/0217309 | A1* | 7/2019 | Yossifon | B03C 5/028 |

FOREIGN PATENT DOCUMENTS

| | | | |
|---|---|---|---|
| JP | 2010-081838 | A | 4/2010 |
| JP | 2011-521241 | A | 7/2011 |
| JP | 2012-013550 | A | 1/2012 |
| JP | 2015-210128 | A | 11/2015 |
| JP | 2016-174578 | A | 10/2016 |
| WO | WO-2008/152712 | A1 | 12/2008 |
| WO | WO-2009/128483 | A1 | 10/2009 |
| WO | WO-2009/141180 | A1 | 11/2009 |

* cited by examiner

METHOD FOR TRAPPING MICROPARTICLE AND MICROPARTICLE TRAPPING DEVICE

BACKGROUND OF THE INVENTION

Field of the Invention

One aspect of the present invention relates to a method for trapping a microparticle. Another aspect of the present invention relates to a microparticle trapping device.

Description of Related Art

Known microparticle trapping devices trap microparticle through dielectrophoresis (see, for example, Japanese Unexamined Patent Publication No. 2015-210128 and Japanese Unexamined Patent Publication No. 2011-521241). The above-described microparticle trapping devices include a plurality of comb electrodes configured to make an inhomogeneous electric field. The microparticle is drifted due to the inhomogeneous electric field and is trapped at the comb electrodes.

SUMMARY OF THE INVENTION

The microparticle trapping devices of Japanese Unexamined Patent Publication No. 2015-210128 and Japanese Unexamined Patent Publication No. 2011-521241 trap the microparticle on a line parallel to an electrode through dielectrophoresis. However, the microparticle trapping device configured to trap microparticles on a line has a limit in increasing a density of the trapped microparticles. A method for densely trapping the microparticles and a device configured to densely trap the microparticles are desirably developed through dielectrophoresis.

An object of one aspect of the present invention is to provide a method for trapping a microparticle to densely trapping microparticles through dielectrophoresis. An object of another aspect of the present invention is to provide a method for analyzing a microparticle trapped through the method for trapping the microparticle. An object of still another aspect of the present invention is to provide a microparticle trapping device configured to densely trap microparticles through dielectrophoresis. An object of yet another aspect of the present invention is to provide a microparticle analysis device including the microparticle trapping device.

A method for trapping a microparticle through dielectrophoresis according to one aspect includes: preparing a fluid channel, first and second electrodes configured to generate an electric field in the fluid channel, and an electrical insulator formed with at least one opening between the first and second electrodes in the fluid channel; injecting a fluid including microparticle into the fluid channel; and applying a voltage to the first and second electrodes so that an inhomogeneous electric field is made through the at least one opening between the first and second electrodes in the fluid channel.

According to the one aspect, the inhomogeneous electric field is made through the at least one opening between the first and second electrodes in the fluid channel, and the electric field concentrates around the at least one opening. Therefore, the microparticle included in the fluid injected into the fluid channel is affected due to the dielectrophoretic force and are trapped around the opening. The one aspect densely traps microparticles from the fluid.

In the one aspect, the preparing step may include preparing a housing for the fluid channel. The housing may include a base and a wall defining the fluid channel with the base, the first and second electrodes may be disposed on the base, and the electrical insulator may be disposed on the wall. The injecting step may include injecting the fluid including the microparticle into the fluid channel so that the particle comes in contact with the first and second electrodes, and disposing the wall on the base so that the at least one opening is positioned in the fluid including the microparticle.

In a case where the fluid channel is defined such that the at least one opening is positioned in the fluid after the fluid including the microparticle is injected into the fluid channel, the microparticle included in the fluid are trapped around the opening due to the application of the voltage to the first and second electrodes.

In the one aspect, the applying step may include applying the voltage to the first and second electrodes to exert a positive dielectrophoretic force on the fluid including the microparticle.

In a case where the voltage is applied such that the positive dielectrophoretic force is generated, the microparticle in the fluid are reliably trapped around the opening.

In the one aspect, the preparing step may include preparing the electrical insulator, at least one of slit-shaped opening is formed in the electrical insulator.

A method for analyzing a microparticle according to another aspect includes: trapping the microparticle through the above-mentioned method for trapping the microparticle through dielectrophoresis; irradiating the trapped microparticle with first light; and detecting second light from the microparticle, the second light being emitted due to irradiation to the microparticle with the first light.

In a case where the microparticle analysis method includes trapping the microparticle, irradiating the first light, and detecting the second light, densely trapped microparticles around the opening are irradiated with the first light, and the amount of the second light from the microparticle is increased.

In the other aspect, the trapping step may include preparing the electrical insulator transparent to the first light and the second light.

In a case where the electrical insulator transparent to each wavelength of the first light and the second light is prepared, the amount of the second light from the microparticle is further increased.

In the other aspect, the detecting step may include detecting fluorescence from the microparticle, the fluorescence being emitted due to the irradiation with the first light.

A microparticle trapping device according to still another aspect includes: a fluid channel configured to be injected with a fluid including a microparticle; first and second electrodes configured to generate an electric field in the fluid channel; and an electrical insulator formed with at least one opening between the first and second electrodes in the fluid channel. The electrical insulator is disposed between the first and second electrodes so that an inhomogeneous electric field is made through the at least one opening between the first and second electrodes in the fluid channel, and the still other aspect is configured to trap the microparticle through dielectrophoresis.

According to the still other aspect, the inhomogeneous electric field is made through the at least one opening between the first and second electrodes in the fluid channel, and the electric field concentrates around the opening. Therefore, through dielectrophoresis, the microparticles in the fluid channel are densely trapped around the opening.

The still other aspect may include a housing including a base and a wall defining the fluid channel with the base. The first and second electrodes may be disposed on the base. The electrical insulator may be disposed on the wall.

In the configuration in which the housing includes the base on which the first and second electrodes are disposed, the fluid including the microparticle is injected to the first and second electrodes disposed on the base.

In the still other aspect, the first and second electrodes may be configured to apply a voltage to exert a positive dielectrophoretic force on the fluid including the microparticle.

In the configuration in which the first and second electrodes is configured to apply the voltage to exert the positive dielectrophoretic force on the fluid, the microparticle in the fluid is reliably trapped around the opening.

In the still other aspect, the opening may have a slit shape.

A microparticle analysis device according to yet another aspect includes the microparticle trapping device, a light irradiation unit configured to irradiate the microparticle trapped around the opening with first light, and a light detection unit configured to detect second light from the microparticle, the second light being emitted due to the irradiation to the microparticle with the first light.

In the configuration in which the microparticle analysis device includes the light irradiation unit and the light detection unit, the microparticle trapped around the opening is irradiated with the first light, and the amount of the second light from the microparticle is increased.

In the yet other aspect, the electrical insulator may be transparent to the first light and the second light.

In the configuration in which the electrical insulator is transparent to each wavelength of the first light and the second light, the amount of the second light from the microparticle is further increased.

In the yet other aspect, the light detection unit may be configured to detect fluorescence from the microparticle, the fluorescence being emitted due to the irradiation with the first light.

The present invention will become more fully understood from the detailed description given hereinafter and the accompanying drawings which are given by way of illustration only, and thus are not to be considered as limiting the present invention.

Further scope of applicability of the present invention will become apparent from the detailed description given hereinafter. However, it should be understood that the detailed description and specific examples, while indicating embodiments of the invention, are given by way of illustration only, since various changes and modifications within the spirit and scope of the invention will become apparent to those skilled in the art from this detailed description.

DETAILED DESCRIPTION OF EMBODIMENTS

Figure 1:
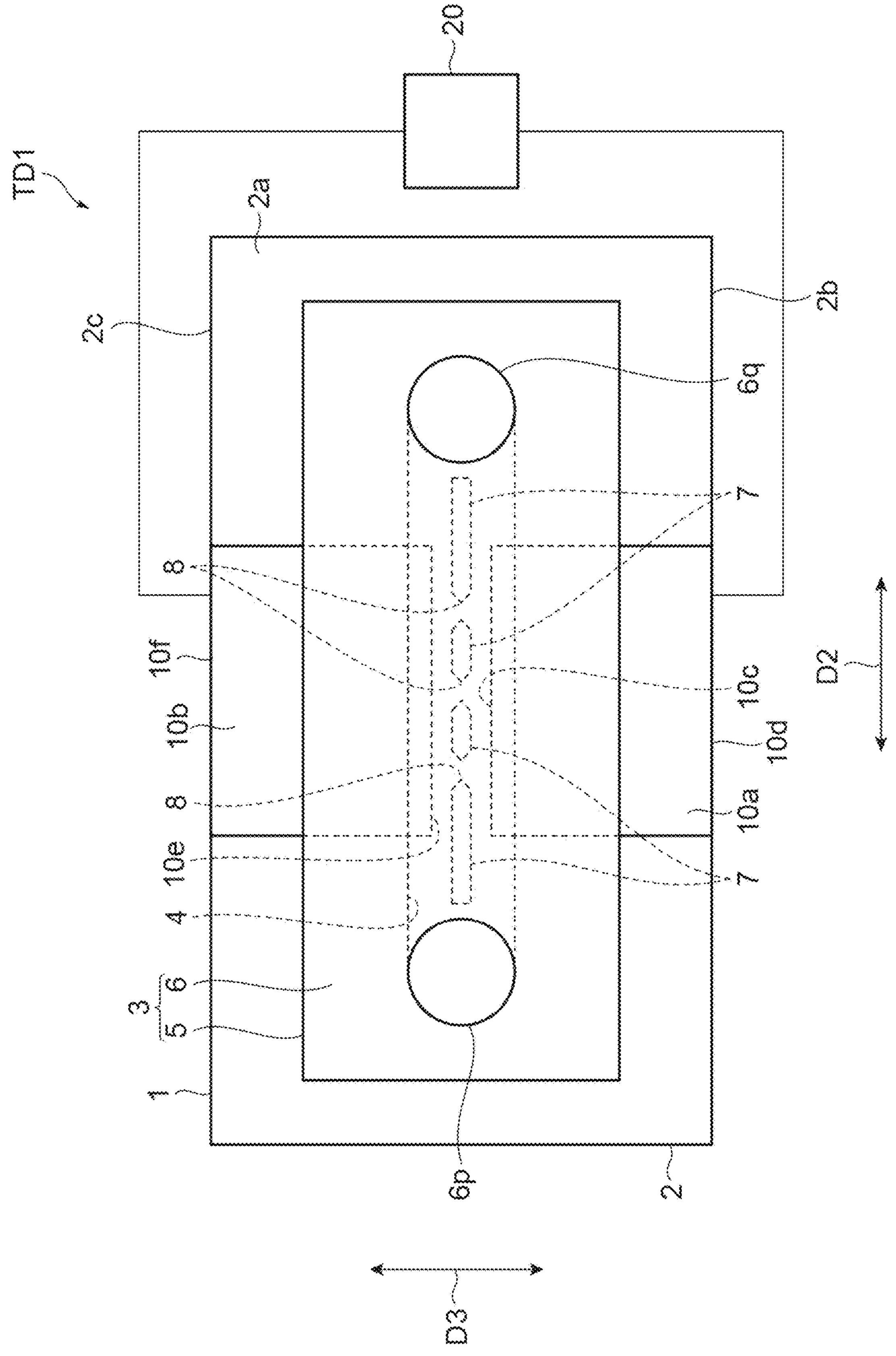
FIG. 1 is a schematic view illustrating a configuration of a microparticle analysis device according to a first embodiment.

Hereinafter, embodiments of the present invention will be described in detail with reference to the accompanying drawings. In the following description, the same elements or elements having the same functions are denoted with the same reference numerals and overlapped explanation is omitted.

First Embodiment

Figure 2:
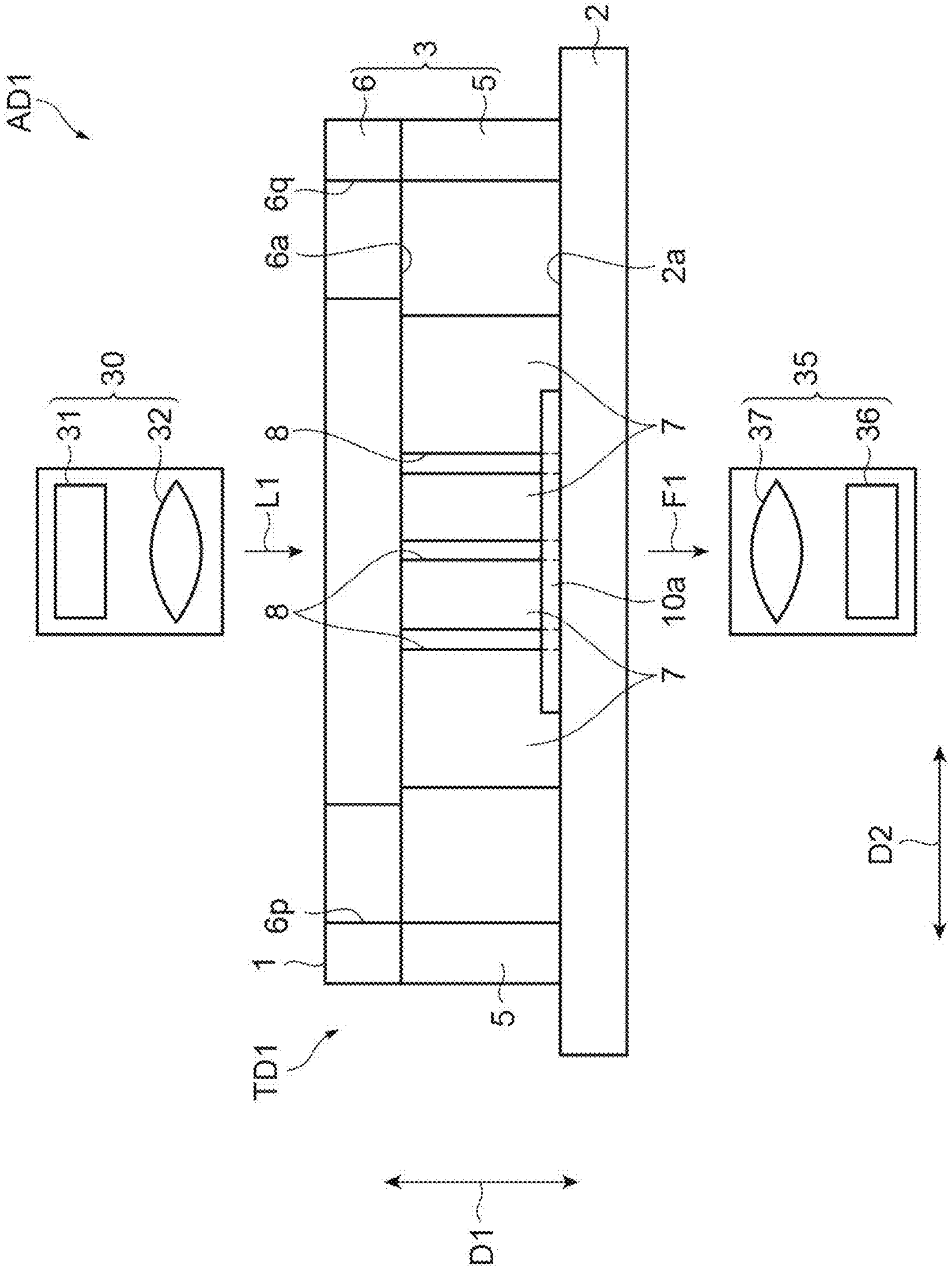
FIG. 2 is a schematic view illustrating a cross-sectional configuration of the microparticle analysis device according to the first embodiment.
Figure 3:
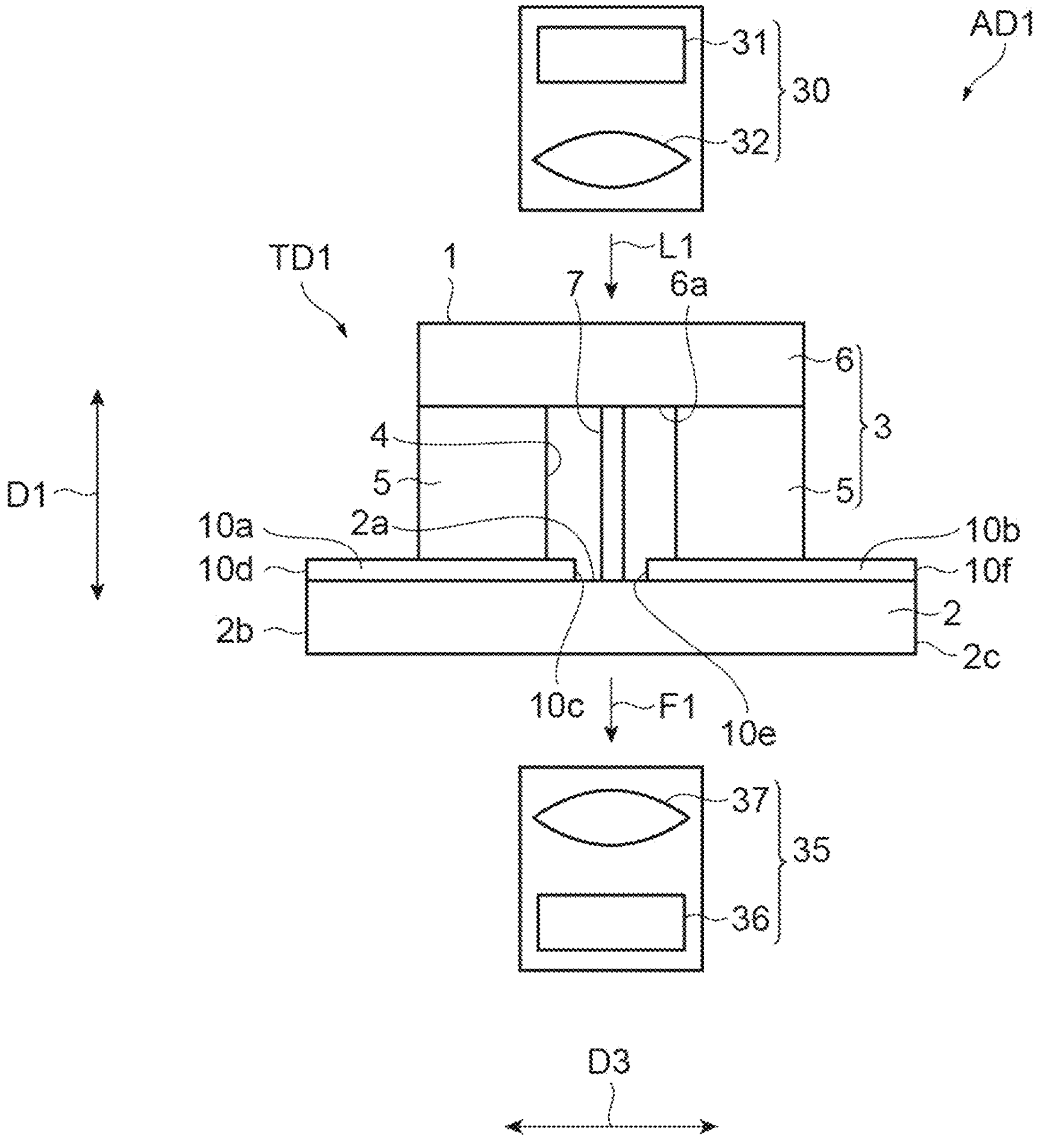
FIG. 3 is a schematic view illustrating a cross-sectional configuration of the microparticle analysis device according to the first embodiment.
Figure 4:
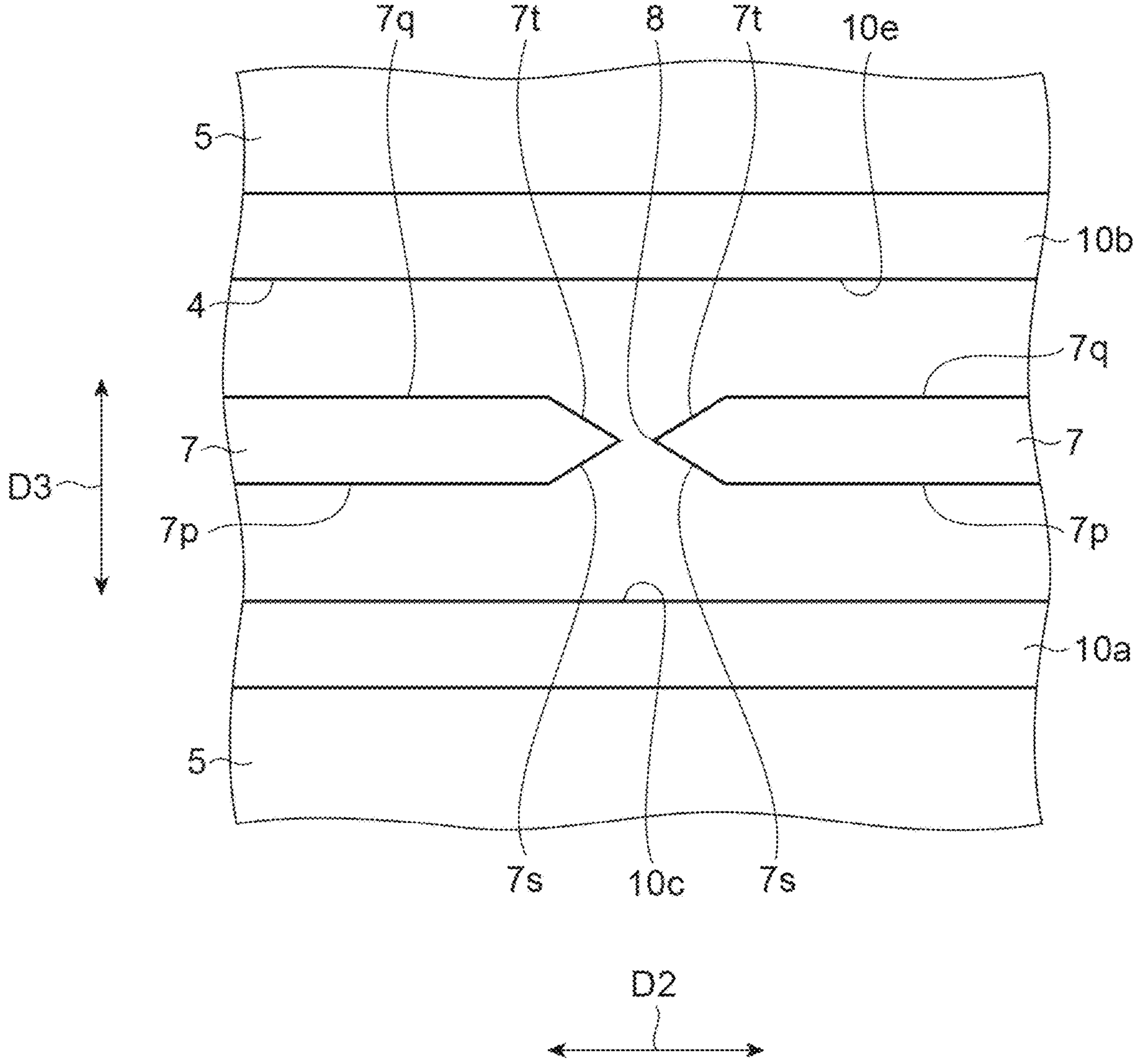
FIG. 4 is a schematic view illustrating a cross-sectional configuration of a partition wall.
Figure 5:
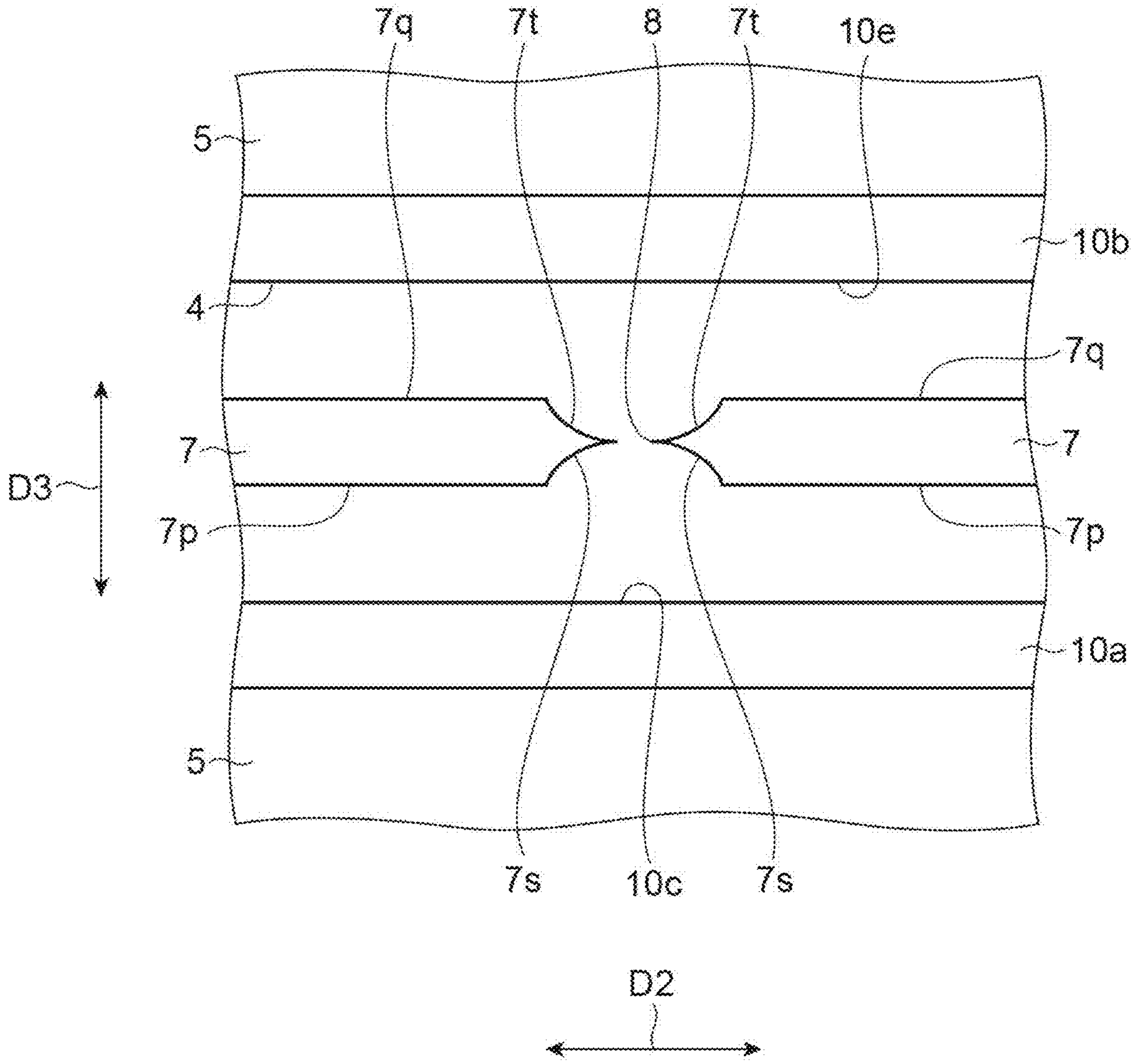
FIG. 5 is a schematic view illustrating a cross-sectional configuration of another example of the partition wall.

The configuration of the microparticle analysis device according to the first embodiment will be described with reference to FIGS. 1 to 5. FIG. 1 is a schematic view illustrating the configuration of the microparticle analysis device according to the first embodiment when viewed in a first direction. FIG. 2 is a schematic view illustrating a cross-sectional configuration of the microparticle analysis device according to the first embodiment when viewed in a third direction. FIG. 3 is a schematic view illustrating a cross-sectional configuration of the microparticle analysis device according to the first embodiment when viewed in a second direction. FIG. 4 is a schematic view illustrating a cross-sectional configuration of the partition wall when viewed in the first direction. FIG. 5 is a schematic view illustrating a cross-sectional configuration of another example of the partition wall when viewed in the first direction.

A microparticle analysis device AD1 includes a microparticle trapping device TD1. The configuration of the microparticle trapping device TD1 will be described below. The microparticle trapping device TD1 includes a housing 1 and a plurality of electrodes 10*a* and 10*b*. In the present embodiment, the microparticle trapping device TD1 includes a pair of electrodes 10*a* and 10*b*. The microparticle trapping device TD1 traps the microparticle included in a fluid through dielectrophoresis. In the present embodiment, the microparticle trapping device TD1 traps the microparticle from a suspension in which the microparticle is suspended. The fluid includes, for example, a liquid. The liquid includes, for example, pure water. The microparticle include, for example, a polystyrene bead. The suspension includes, for example, pure water in which the microparticle including the polystyrene bead is suspended.

The housing 1 includes a base 2 and a wall 3. The base 2 and the wall 3 are arranged in a first direction D1. The base 2 and the wall 3 are coupled to each other. In the housing 1, a fluid channel 4 is formed with the base 2 and the wall 3. The fluid channel 4 is defined by the housing 1. In the present embodiment, the fluid channel 4 includes a flow path surrounded with the base 2 and the wall 3. The base 2 and the wall 3 define the fluid channel 4. The suspension is injected into the fluid channel 4. The suspension flows in the fluid channel 4. The suspension fills at least a part of the fluid channel 4. The suspension may fill the entire fluid channel 4. The suspension flows, for example, in a second direction D2. The second direction D2 intersects the first direction D1. The base 2 and the wall 3 are formed separately from each other, for example. The base 2 and the wall 3 are bonded to each other with an adhesive, for example. The base 2 and the wall 3 may be integrally formed with each other.

The base 2 includes, for example, an insulating material. The insulating material of the base 2 includes, for example, glass. The glass includes, for example, a glass slide. The base 2 has, for example, a rectangular parallelepiped shape. A thickness of the base 2 is, for example, 1 mm. A length of the base 2 in the second direction D2 is, for example, 38 mm. A length of the base 2 in a third direction D3 is, for example, 26 mm. In the present embodiment, the third direction D3 intersects the first direction D1 and the second direction D2.

The wall 3 includes a side wall 5 and an upper wall 6. The side wall 5 and the upper wall 6 are coupled to each other. The side wall 5 surrounds the fluid channel 4 when viewed in the first direction D1. The upper wall 6 is opposed to the base 2 in the first direction D1. The base 2, the side wall 5, and the upper wall 6 surround the fluid channel 4 when viewed in the second direction D2 and the third direction D3. The side wall 5 and the upper wall 6 are formed separately from each other, for example. The side wall 5 and the upper wall 6 are bonded to each other with an adhesive, for example. The side wall 5 and the upper wall 6 may be integrally formed. The side wall 5 and the upper wall 6 includes, for example, an insulating material. The insulating material of the side wall 5 and the upper wall 6 includes, for example, silicone rubber. The silicone rubber includes, for example, polydimethylsiloxane. Polydimethylsiloxane is a main component of silicone rubber.

In the upper wall 6, for example, an injection port 6*p* and a drain port 6*q* are formed. An opening for injecting is formed in the injection port 6*p*. The opening for injecting is configured to inject the suspension into the fluid channel 4 from the outside of the housing 1. An opening for discharging is formed in the drain port 6*q*. The opening for discharging is configured to drain the suspension from the fluid channel 4 to the outside of the housing 1. The injection port 6*p* and the drain port 6*q* are arranged in the second direction D2, for example. The opening of the injection port 6*p* and the opening of the drain port 6*q* have, for example, a circular shape when viewed in the first direction D1. The opening of the injection port 6*p* and the opening of the drain port 6*q* may have, for example, an elliptical shape or a rectangular shape when viewed in the first direction D1. The suspension is supplied to the fluid channel 4, for example, through the injection port 6*p*. For example, a syringe pump is used to supply the suspension to the fluid channel 4. The suspension is drained to the outside of the housing 1, for example, through the drain port 6*q*. The suspension drained to the outside of the housing 1 is, for example, circulated outside the housing 1 and then injected into the fluid channel 4 again through the injection port 6*p*. The suspension drained to the outside of the housing 1 may be discarded without being injected into the fluid channel 4 again. The "rectangular shape" in the present description includes a rounded cornered rectangular shape and a square shape.

When viewed in the second direction D2 and the third direction D3, the fluid channel 4 has, for example, a rectangular shape. A length of the fluid channel 4 in the first direction D1 is, for example, 20 μm. A length of the fluid channel 4 in the second direction D2 is, for example, 20 mm A length of the fluid channel 4 in the third direction D3 is, for example, 500 μm.

A partition wall 7 is disposed on the wall 3. The partition wall 7 is positioned in the fluid channel 4. The partition wall 7 is in contact with, for example, the upper wall 6. The partition wall 7 is disposed between the upper wall 6 and the base 2 in the first direction D1, for example. The partition wall 7 may be in contact with the base 2. In a region excluding the injection port 6*p* and the drain port 6*q*, the partition wall 7 is disposed in the second direction D2 in the fluid channel 4, for example. The partition wall 7 is disposed in a center region of the fluid channel 4, for example, when viewed in the second direction D2. The partition wall 7 separates the fluid channel 4 in the third direction D3, for example. The partition wall 7 may divide the fluid channel 4 into equal halves in the third direction D3 when viewed in the second direction D2. The partition wall 7 includes, for example, an insulating material. The insulating material of the partition wall 7 includes, for example, silicone rubber.

The partition wall 7 may be integrally formed with each other with the upper wall 6. The partition wall 7 may be formed separately from each other from the upper wall 6. In a case where the base 2 and the partition wall 7 are formed separately from each other, the base 2 and the partition wall 7 are bonded to each other with, for example, an adhesive. The partition wall 7 is formed on the base 2, for example. In a case where the partition wall 7 is formed on the base 2, the partition wall 7 is bonded to the base 2 with, for example, an adhesive. The partition wall 7 may be integrally formed with the base 2. The partition wall 7 is in contact with, for example, the upper wall 6. The partition wall 7 may not be in contact with the upper wall 6. FIGS. 2 and 3 illustrate a configuration in which the partition wall 7 is in contact with the base 2 and the upper wall 6.

At least one opening 8 is formed in the partition wall 7. In the present embodiment, three openings 8 are formed in the partition wall 7. The three openings 8 are arranged in the second direction D2, for example. Each of the openings 8 has, for example, a slit shape. The opening 8 is formed between a surface 6*a* inside the upper wall 6 and a surface 2*a* inside the base 2.

The opening 8 is formed to touch, for example, the surface 6*a* and is also formed to touch the surface 2*a*. In this case, the opening 8 is defined by the partition wall 7, the upper wall 6, and the base 2. The partition wall 7, the upper wall 6, and the base 2 constitute an electrical insulator in which the opening 8 is formed. The opening 8 is formed in the fluid channel 4 and is positioned between the electrodes 10*a* and 10*b*. The opening 8 is not formed to touch, for example, the surface 6*a* and is formed to touch the surface 2*a*. In this case, the opening 8 is defined by the partition wall 7 and the base 2. The partition wall 7 and the base 2 constitute the electrical insulator in which the opening 8 is formed. The opening 8 is formed to touch, for example, the surface 6*a* and is not formed to touch the surface 2*a*. In this case, the opening 8 is defined by the partition wall 7 and the upper wall 6. The partition wall 7 and the upper wall 6 constitute the electrical insulator in which the opening 8 is formed. The opening 8 is not formed to touch, for example, the surface 6*a* and is not formed to touch the surface 2*a* either. In this case, the opening 8 is defined by the partition wall 7. The partition wall 7 constitutes the electrical insulator in which the opening 8 is formed.

In the present embodiment, all the three openings 8 are positioned in the suspension in the first direction D1. The opening 8 may have, for example, a circular shape when viewed in the third direction D3.

FIG. 4 illustrates one of the three openings 8 formed on the partition wall 7. In the present embodiment, the partition wall 7 includes, for example, a plurality of parts. A plurality of parts defines the opening 8. Each part includes two side surfaces 7*p* and 7*q*. The side surfaces 7*p* and 7*q* define both ends of the partition wall 7 in the third direction D3. The side surfaces 7*p* and 7*q* are disposed in the second direction D2. The partition wall 7 includes an end surface 7*s* intersecting the side surface 7*p* and two end surfaces 7*t* intersecting the side surface 7*q* when viewed in the first direction D1. The end surface 7*s* is coupled to the side surface 7*p*, and the end surface 7*t* is coupled to the side surface 7*q*. The end surfaces 7*s* and 7*t* intersect each other at the tip end of the partition wall 7 in the second direction D2. The tip end of each part is opposed to each other in the second direction D2. The tip end of each part defines the opening 8. In the present embodiment, the tip end of each part has a triangular shape when viewed in the first direction D1. The end surfaces 7*s* and 7*t* may have a curved shape. In a case where the end surfaces 7*s* and 7*t* have a curved shape, the tip end of each part has a rounded shape when viewed in the first direction D1.

FIG. 5 is a view illustrating another example of the opening 8 formed in the partition wall 7. The partition wall 7 according to the present example includes, for example, a plurality of parts. The plurality of parts defines the opening 8. Each part includes the two side surfaces 7*p* and 7*q* and the two end surfaces 7*s* and 7*t*. The side surfaces 7*p* and 7*q* are disposed in the second direction D2. The end surface 7*s* is coupled to the side surface 7*p*, and the end surface 7*t* is coupled to the side surface 7*q*. The end surfaces 7*s* and 7*t* intersect each other at the tip end of the partition wall 7 in the second direction D2. The end surfaces 7*s* and 7*t* have, for example, a concavely curved shape when viewed in the first direction D1. When viewed in the first direction D1, the tip end where the end surfaces 7*s* and 7*t* intersect each other has, for example, a sharp shape. The tip end illustrated in FIG. 5 has a sharper shape than the tip end illustrated in FIG. 4 when viewed in the first direction D1. The tip end where the end surfaces 7*s* and 7*t* intersect each other may have a rounded shape when viewed in the first direction D1.

As illustrated in FIG. 1, the electrodes 10*a* and 10*b* are opposed to each other in the third direction D3. In the present embodiment, the electrodes 10*a* and 10*b* are disposed on the surface 2*a* and are opposed to each other in the third direction D3. The electrode 10*a* includes a pair of end edges 10*c* and 10*d*. The end edges 10*c* and 10*d* define both ends of the electrode 10*a* in the third direction D3. The end edge 10*c* is exposed to the inside of the fluid channel 4. The end edge 10*d* is exposed to the outside of the fluid channel 4 and touches, for example, an end edge 2*b*. The electrode 10*b* includes a pair of end edges 10*e* and 10*f*. The end edges 10*e* and 10*f* define both ends of the electrode 10*b* in the third direction D3. The end edge 10*e* is exposed to the inside of the fluid channel 4. The end edge 10*f* is exposed to the outside of the fluid channel 4 and touches, for example, an end edge 2*c*. The end edges 2*b* and 2*c* define both ends of the base 2 in the third direction D3. For example, in a case where the electrode 10*a* constitutes a first electrode, the electrode 10*b* constitutes a second electrode.

The electrodes 10*a* and 10*b* include, for example, a metal film. The metal film includes, for example, an aluminum film. The metal film is formed through, for example, a vapor deposition method. The electrodes 10*a* and 10*b* have, for example, a rectangular shape when viewed in the first direction D1. Thicknesses of the electrodes 10*a* and 10*b* are, for example, 100 nm. The electrodes 10*a* and 10*b* are separated from each other, for example, in the third direction D3. An interval between the electrodes 10*a* and 10*b* in the third direction D3 is, for example, 400 μm. Lengths of the electrodes 10*a* and 10*b* in the third direction D3 are, for example, 12.8 mm. Lengths of the electrodes 10*a* and 10*b* in the second direction D2 are, for example, 10 mm. In the present embodiment, the partition wall 7 divides the fluid channel 4 into equal halves in the third direction D3, for example. The electrodes 10*a* and 10*b* are arranged symmetrically to each other with respect to the partition wall 7, for example, when viewed in the second direction D2. The electrodes 10*a* and 10*b* are electrically connected to a control unit 20. The control unit 20 applies a voltage to the electrodes 10*a* and 10*b*. Due to the application of the voltage, the electrodes 10*a* and 10*b* form an electric field in the fluid channel 4.

The electrodes 10*a* and 10*b* generate an electric field in the third direction D3, for example. The electric field passes through the opening 8 of the partition wall 7. An opening width of the opening 8 is smaller than the lengths of the electrodes 10*a* and 10*b* in the second direction D2. The partition wall 7 excluding the opening 8 blocks a penetration of the electric field. The electric field generated between the electrodes 10*a* and 10*b* is concentrated in the opening 8. As a result, an inhomogeneous electric field is made between the electrodes 10*a* and 10*b*. In the present embodiment, the partition wall 7 is disposed between the electrodes 10*a* and 10*b* so that the inhomogeneous electric field is made around the opening 8. The inhomogeneous electric field is made in the fluid channel 4 and is positioned between the electrodes 10*a* and 10*b*. The electrodes 10*a* and 10*b* are electrically insulated from each other.

The opening width of the opening 8 has a size with which the electric flux density is improved to trap the microparticle in the opening 8. In the present embodiment, the opening width of the opening 8 in the second direction D2 is, for example, 1 to 25 μm. A thickness of the partition wall 7 in the third direction D3 excluding the end portion defining the opening 8 is, for example, 50 μm. In a case where the partition wall 7 includes, for example, the three openings 8, the openings 8 are separated from one another in the second direction D2. An interval between the openings 8 in the second direction D2 is, for example, 200 μm. The opening 8 is separated from the electrodes 10*a* and 10*b*.

In the present embodiment, the voltage applied to the electrodes 10*a* and 10*b* is an alternating-current voltage. The first and second electrodes 10*a* and 10*b* are configured to apply a voltage such that a positive dielectrophoretic force is applied to a fluid including the microparticle. In a case where the alternating-current voltage is applied to the electrodes 10*a* and 10*b*, the microparticle affected due to the positive dielectrophoretic force is trapped around the opening 8, for example. The microparticle affected due to the positive dielectrophoretic force is also trapped in the vicinity of the opening 8, for example. In a case where the alternating-current voltage is applied, the microparticle is trapped at two regions of the opening 8, for example. One region is near the electrode 10*a* and another region is near the electrode 10*b*, for example. The voltage applied to the electrodes 10*a* and 10*b* may be a direct-current voltage.

The configuration of the microparticle analysis device AD1 will be described with reference to FIGS. 2 and 3. The microparticle analysis device AD1 includes the microparticle trapping device TD1, a light irradiation unit 30, and a light detection unit 35. The microparticle trapping device TD1 is disposed between the light irradiation unit 30 and the light detection unit 35 in the first direction D1, for example. The light irradiation unit 30 is disposed near the upper wall 6 of the housing 1, for example. The light irradiation unit 30 irradiates the opening 8 with light through the upper wall 6 in the first direction D1, for example. In a case where the microparticle is trapped around the opening 8, the microparticle is irradiated with light L1 from the light irradiation unit 30. The light irradiation unit 30 includes, for example, a light emitting element 31 and a focusing lens 32. The light emitting element 31 includes, for example, an LED (Light Emitting Diode). The focusing lens 32 is disposed, for example, between the light irradiation element 31 and the upper wall 6. The focusing lens 32 focuses, around the opening 8, the light L1 from the light emitting element 31.

The light detection unit 35 is disposed, for example, near the base 2 and detects the light L1 from the light irradiation unit 30 in the first direction D1. In a case where the microparticle is trapped around the opening 8, the light detection unit 35 detects the light L1 from the microparticle through the base 2 in the first direction D1, for example. The microparticle generate light F1 due to the irradiation with the light L1 from the light irradiation unit 30. In the present embodiment, the light F1 includes, for example, fluorescence. The polystyrene bead, which are an example of the microparticle, generate, for example, fluorescence due to the irradiation with the light L1. The light detection unit 35 has sensitivity to, for example, fluorescence. The light detection unit 35 includes a photodetector 36 and a focusing lens 37. The photodetector 36 includes, for example, a photomultiplier tube. The focusing lens 37 is disposed between the base 2 and the photodetector 36. The focusing lens 37 focuses light from the opening 8. In the present embodiment, the three openings 8 are arranged in the second direction D2. For example, the microparticle analysis device AD1 moves the light irradiation unit 30 and the light detection unit 35 in the second direction D2 and irradiates all the openings 8 with the light L1. In the present embodiment, in the housing 1, at least regions positioned in the optical path of the light L1 and an optical path of the light F1 are transparent to the wavelengths of the light L1 and the light F1, for example. Therefore, the base 2, the upper wall 6, and the partition wall 7 include a material transparent to the wavelengths of the light L1 and the light F1. The glass slide and the silicone rubber used in the present embodiment are transparent to the wavelengths of the light L1 and the light F1, for example. For example, in a case where the light L1 constitutes a first light, the light F1 constitutes a second light.

Figure 6:
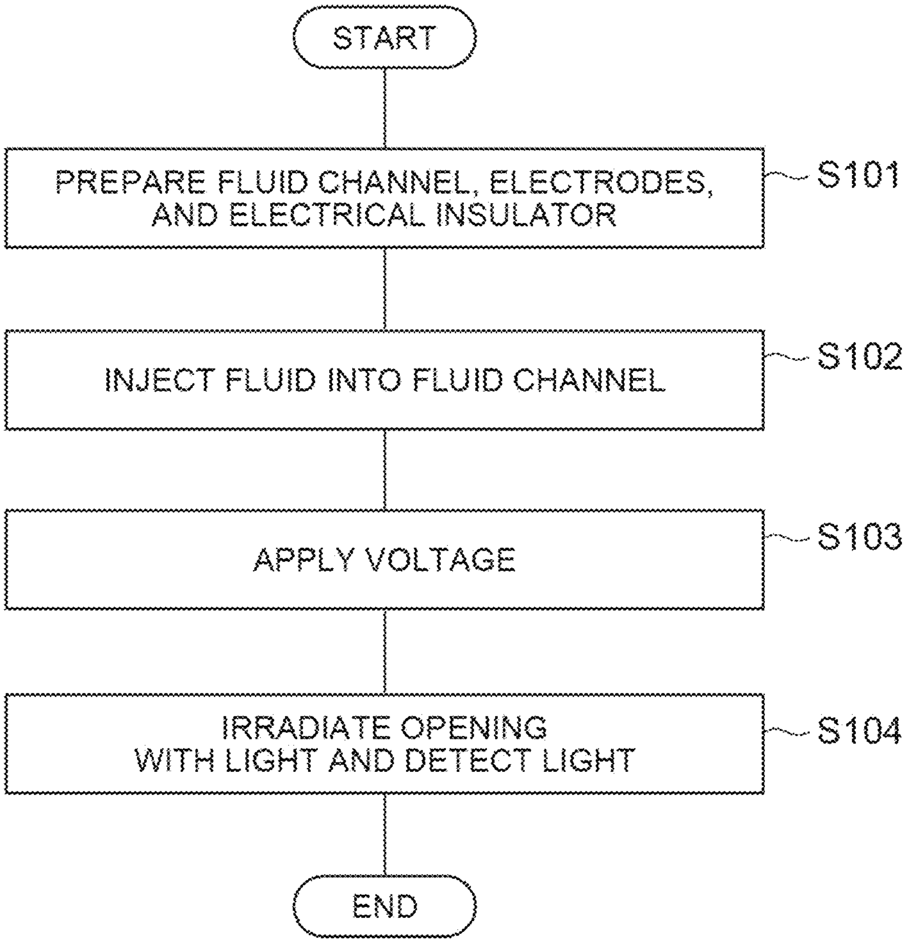
FIG. 6 is a flowchart illustrating a microparticle analysis method according to the first embodiment.

The microparticle analysis method according to the first embodiment will be described with reference to FIG. 6. FIG. 6 is a flowchart illustrating a microparticle analysis method according to the first embodiment; The microparticle analysis method includes a microparticle trapping method.

The microparticle trapping method will be described. In the microparticle trapping method, first, the microparticle trapping device TD1 is prepared (S101). The fluid channel 4, the electrodes 10*a* and 10*b*, and the partition wall 7 are prepared. In the housing 1, the partition wall 7 is disposed such that the at least one opening 8 is formed. The opening 8 is formed in the fluid channel 4 and is positioned between the electrodes 10*a* and 10*b*.

Next, the fluid is injected into the fluid channel 4 (S102). For example, the microparticle including polystyrene bead is suspended in pure water to prepare the suspension as the fluid. In the present embodiment, the concentration of the microparticle in the suspension is, for example, $2\times10^{8}$ microparticles/mL. A diameter of the microparticle is, for example, 0.1 μm. After the suspension is prepared, the suspension is injected into the fluid channel 4 through the injection port 6*p*. In the fluid channel 4 in which the suspension has been injected, the suspension flows, for example, in the second direction D2. The suspension may be injected into the fluid channel 4 at a constant flow rate through a syringe pump coupled to the injection port 6*p*. In a case where the suspension is injected into the fluid channel 4 at a constant flow rate, the flow rate of the suspension is, for example, 36 μL/hour. The suspension excessively injected into the fluid channel 4 is, for example, drained through the drain port 6*q*. In a case where air and other fluid remain in the fluid channel 4, the remaining air and other fluid are drained through the drain port 6*q*.

A voltage is applied to the electrodes 10*a* and 10*b* at any timings of the same time as the injection of the suspension in the fluid channel 4, before the injection of the suspension in the fluid channel 4, or after the injection of the suspension in the fluid channel 4 (S103). In the present embodiment, the voltage is applied to the electrodes 10*a* and 10*b* to make the inhomogeneous electric field between the electrodes 10*a* and 10*b* through the opening 8. A frequency of the applied voltage is, for example, 1 MHz. A magnitude of the applied voltage is, for example, 70 Vpp. In a case where the voltage is applied to the first and second electrodes 10*a* and 10*b*, the voltage is applied to the first and second electrodes 10*a* and 10*b* so that a positive dielectrophoretic force affects the fluid including the polystyrene bead. Due to the application of the voltage, the opening 8 makes the inhomogeneous electric field between the electrodes 10*a* and 10*b* in the fluid channel 4. The electric field generated in the fluid channel 4 is concentrated around the opening 8. The polystyrene bead in the suspension are affected due to a positive dielectrophoretic force, for example, and are collected around the opening 8 and trapped around the opening 8. In the present embodiment, the fluid channel 4 forms a flow path, and the suspension including the polystyrene bead at a concentration before being trapped around the opening 8 is supplied to the vicinity of the opening 8 one after another, for example, along the flow of the flow path.

The microparticle analysis method will be described. In the microparticle analysis method, the opening 8 is irradiated with light and the light irradiated around the opening 8 is detected (S104). In the microparticle analysis method, the opening 8 is irradiated with the light L1. In a case where the polystyrene bead is trapped around the opening 8, the trapped polystyrene bead is irradiated with the light L1. The light irradiation unit 30 is driven, and the polystyrene bead trapped around the opening 8 is irradiated with the light L1. The polystyrene bead generates, for example, fluorescence due to the irradiation with the light L1. In the present embodiment, the light detection unit 35 is driven, and the light detection unit 35 detects the fluorescence emitted from the polystyrene bead. In the microparticle analysis method, the fluorescence is detected with the light detection unit 35, and an optical measurement of the polystyrene bead is performed.

Effects of the present embodiment will be described. The method for trapping the microparticle through dielectrophoresis includes: preparing the fluid channel 4, first and second electrodes configured to generate an electric field in the fluid channel 4, and the electrical insulator formed with at least one opening 8 between the first and second electrodes 10*a* and 10*b* in the fluid channel 4; injecting the fluid including microparticle into the fluid channel 4; and applying the voltage to the first and second electrodes 10*a* and 10*b* so that the inhomogeneous electric field is made through the at least one opening 8 between the first and second electrodes 10*a* and 10*b* in the fluid channel 4.

In the present embodiment, the inhomogeneous electric field is made through the at least one opening 8 between the first and second electrodes 10*a* and 10*b* in the fluid channel 4, and the electric field concentrates around the at least one opening 8. Therefore, the microparticle included in the fluid injected into the fluid channel 4 is affected due to the dielectrophoretic force and are trapped around the opening 8. The method for trapping the microparticle densely traps the microparticle from the fluid.

In the method for trapping the microparticle, the applying step includes applying the voltage to the first and second electrodes 10*a* and 10*b* to exert the positive dielectrophoretic force on the fluid including the microparticle.

Therefore, the microparticle in the fluid is reliably trapped around the opening 8.

The method for analyzing the microparticle includes: trapping the microparticle through the above-mentioned method for trapping a microparticle through dielectrophoresis; irradiating the trapped microparticle with the light L1; and detecting the light F1 from the microparticle, the light F1 being emitted due to the irradiation to the microparticle with the light F1.

Therefore, the densely trapped microparticle around the opening 8 is irradiated with the light L1, and the amount of the light F1 from the microparticle is increased. The amount of the fluorescence from the microparticle is increased. In the present embodiment, the microparticle is trapped around the opening 8 separated from the electrodes 10*a* and 10*b*. Therefore, the light L1 with which the light irradiation unit 30 irradiates the microparticle and the light F1 from the microparticle tend not to be shielded with the electrodes 10*a* and 10*b*.

In the method for analyzing the microparticle, the trapping step includes preparing the partition wall 7 transparent to the light L1 and the light F1.

Therefore, the amount of the light F1 from the microparticle is further increased.

In the method for analyzing the microparticle, the detecting step includes detecting fluorescence from the microparticle, the fluorescence being emitted due to the irradiation with the first light. In a case where the microparticle emits light other than the fluorescence due to the irradiation of the light L1, the light other than the fluorescence emitted from the microparticle may be detected in detecting the light F1 from the microparticle.

The microparticle trapping device TD1 includes: the fluid channel 4 configured to be injected with the fluid including the microparticle; first and second electrodes 10*a* and 10*b* configured to generate the electric field in the fluid channel 4; and the partition wall 7 formed with at least one opening 8 between the first and second electrodes 10*a* and 10*b* in the fluid channel 4. The partition wall 7 is disposed between the first and second electrodes 10*a* and 10*b* so that the inhomogeneous electric field is made through the at least one opening 8 between the first and second electrodes 10*a* and 10*b* in the fluid channel 4, and the microparticle trapping device TD1 is configured to trap the microparticle through dielectrophoresis.

In the present embodiment, the inhomogeneous electric field is made through the at least one opening 8 between the first and second electrodes 10*a* and 10*b* in the fluid channel 4, and the electric field concentrates around the opening 8. Therefore, through dielectrophoresis, the microparticle trapping device TD1 densely traps the microparticles around the opening 8 from the fluid.

In the microparticle trapping device TD1, the first and second electrodes 10*a* and 10*b* are configured to apply the voltage to exert the positive dielectrophoretic force on the fluid including the microparticle.

Therefore, the microparticle in the fluid is reliably trapped around the opening 8.

The microparticle analysis device AD1 includes the microparticle trapping device TD1, the light irradiation unit 30 configured to irradiate the microparticle trapped around the opening 8 with light, and the light detection unit 35 configured to detect the light F1 from the microparticle, the light F2 being emitted due to the irradiation to the microparticle with the light L1.

Therefore, the trapped microparticle around the opening 8 is irradiated with the light L1, and the amount of the light F1 from the microparticle is increased. That is, the amount of fluorescence from the microparticle is increased.

In the microparticle analysis device AD1, the partition wall 7 is transparent to each wavelength of the light L1 and the light F1.

As a result, the amount of the light F1 from the microparticle is further increased.

In the microparticle analysis device AD1, the light detection unit 35 detects the fluorescence from the microparticle, the fluorescence being emitted due to the irradiation of the light L1. In a case where the microparticle emit light other than the fluorescence due to the irradiation of the light L1, the light detection unit 35 may detect light other than the fluorescence emitted from the microparticle.

As described above, the light L1 with which the light irradiation unit 30 irradiates the microparticle and the light F1 from the microparticle tend not to be shielded with the electrodes 10*a* and 10*b*. Therefore, the first and second electrodes 10*a* and 10*b* may not include a transparent electrode.

Transparent electrodes are generally expensive. Therefore, the configuration in which the first and second electrodes 10*a* and 10*b* do not include a transparent electrode provides the microparticle trapping device TD1 at low cost, and achieves the microparticle trapping method at low cost. As a result, the configuration in which the first and second electrodes 10*a* and 10*b* do not include a transparent electrode provides the microparticle analysis device AD1 at low cost, and achieves the microparticle analysis method at low cost.

In the present embodiment, the fluid including the microparticle may include a suspension other than the suspension described above. The fluid including microparticle includes, for example, a virus suspension. The virus suspension is prepared due to suspending rotavirus in ultrapure water. The rotavirus is fluorescently labeled with a fluorescent dye. The fluorescent dye includes, for example, Alexa Fluor (registered trademark) 488 5-TFP. A concentration of the virus in the suspension is, for example, 300 ng/mL. An outer diameter of the virus is, for example, 100 nm. After the suspension is prepared, for example, the suspension is injected into the fluid channel 4 through the injection port 6*p*.

An alternating-current voltage with a frequency of 1 MHz is applied to the electrodes 10*a* and 10*b*. A magnitude of the applied voltage is, for example, 70 Vpp. The rotavirus in the suspension is affected due to a positive dielectrophoretic force, for example, and is trapped around the opening 8. The microparticle analysis device AD1 irradiates the rotavirus trapped around the opening 8 with light, and fluorescence emitted from the rotavirus is detected.

In a case where the suspension is the virus suspension, the number and size of the openings 8 formed in the partition wall 7 may be set as follows. That is, two openings 8 are formed in the partition wall 7. The opening 8 has a slit shape formed in the first direction D1, for example. An opening width of one opening 8 of the two openings is, for example, 1 μm. An opening width of the other opening 8 is, for example, 5 μm. Except for the end portion defining the opening, a thickness of the partition wall 7 in the third direction D3 is, for example, 50 μm. The two openings 8 are arranged in the second direction D2. An interval between the two openings 8 in the second direction D2 is, for example, 200 μm.

The virus suspension is injected into the fluid channel 4. The virus suspension includes, for example, two types of viruses. One virus includes a tobacco mosaic virus (TMV). Another virus includes a herpes simplex virus type 1 (HSV). The tobacco mosaic virus is red fluorescently labeled with rhodamine B, for example. The herpes simplex virus type 1 is green fluorescently labeled with NBD-dihexadecylamine, for example. These two types of viruses are suspended in the same ultrapure water. A concentration of the tobacco mosaic virus in the suspension is, for example, $7\times10^6$ viral particles/mL. A concentration of the herpes simplex virus type 1 in the suspension is, for example, $3\times10^6$ viral particles/mL. The tobacco mosaic virus is made of a cylindrical particle. Of the tobacco mosaic virus, a diameter of the bottom surface of the cylindrical shape is, for example, 18 nm, and a height of the cylindrical shape is, for example, 280 nm. An outer diameter of the herpes simplex virus type 1 is, for example, 250 nm. After the suspension is prepared, the suspension is injected into the fluid channel 4 through the injection port 6*p*.

An alternating-current voltage with a frequency of 1 MHz is applied to the electrodes 10*a* and 10*b*. A magnitude of the applied voltage is, for example, 70 Vpp. The two types of viruses in the suspension are affected due to a positive dielectrophoretic force, for example. The electric field generated between the electrodes 10*a* and 10*b* is more concentrated around the opening 8 as the opening width decreases. In the vicinity of the opening 8 having a small opening width, the dielectrophoretic force affecting the virus is larger than that in the vicinity of the opening 8 having a large opening width. Even in a case where the dielectrophoretic force affecting the tobacco mosaic virus is relatively small, for example, the tobacco mosaic virus is trapped by the two openings 8 having opening widths different from each other. In a case where the dielectrophoretic force detected by the herpes simplex virus type 1 is relatively small, the herpes simplex virus type 1 tends not to be trapped around the opening 8 having the large opening width, and is trapped by the opening 8 having the small opening width, for example. The virus trapped by the opening 8 is irradiated with the light L1, and the light F1 emitted from the virus is detected. The light F1 includes, for example, fluorescence. The tobacco mosaic virus is trapped at the two openings 8 having opening widths different from each other, for example. Red fluorescence derived from the tobacco mosaic virus is observed at the two openings 8. The herpes simplex virus type 1 is trapped by the opening 8 having a small opening width, for example. Green fluorescence derived from the herpes simplex virus type 1 is observed around the opening 8 having a small opening width. In accordance with the size of the opening width of the opening 8, the viruses to be trapped around the opening 8 are selected.

In a case where the virus suspension includes, for example, two types of viruses, the frequency of the alternating-current voltage applied to the electrodes 10*a* and 10*b* is set as follows, for example. The virus suspension includes, for example, the tobacco mosaic virus and the herpes simplex virus type 1 described above.

After the virus suspension is injected into the fluid channel 4, an alternating-current voltage with a frequency of 6 MHz is applied to the electrodes 10*a* and 10*b*. A magnitude of the applied voltage is, for example, 70 Vpp. Of the two types of viruses in the suspension, the tobacco mosaic virus is affected due to a positive dielectrophoretic force, for example, and is trapped around the opening 8. The herpes simplex virus type 1 is affected due to a negative dielectrophoretic force, for example. The herpes simplex virus type 1 tends not to be trapped around the opening 8. The virus trapped around the opening 8 is a tobacco mosaic virus. The virus trapped around the opening 8 is irradiated with the light L1, and the light F1 emitted from the trapped virus is detected. The light F1 includes, for example, fluorescence. The red fluorescence derived from the tobacco mosaic virus is observed around the opening 8. The viruses to be trapped around the opening 8 are selected due to the frequency of the voltage applied to the electrodes 10*a* and 10*b*.

Second Embodiment

Figure 7:
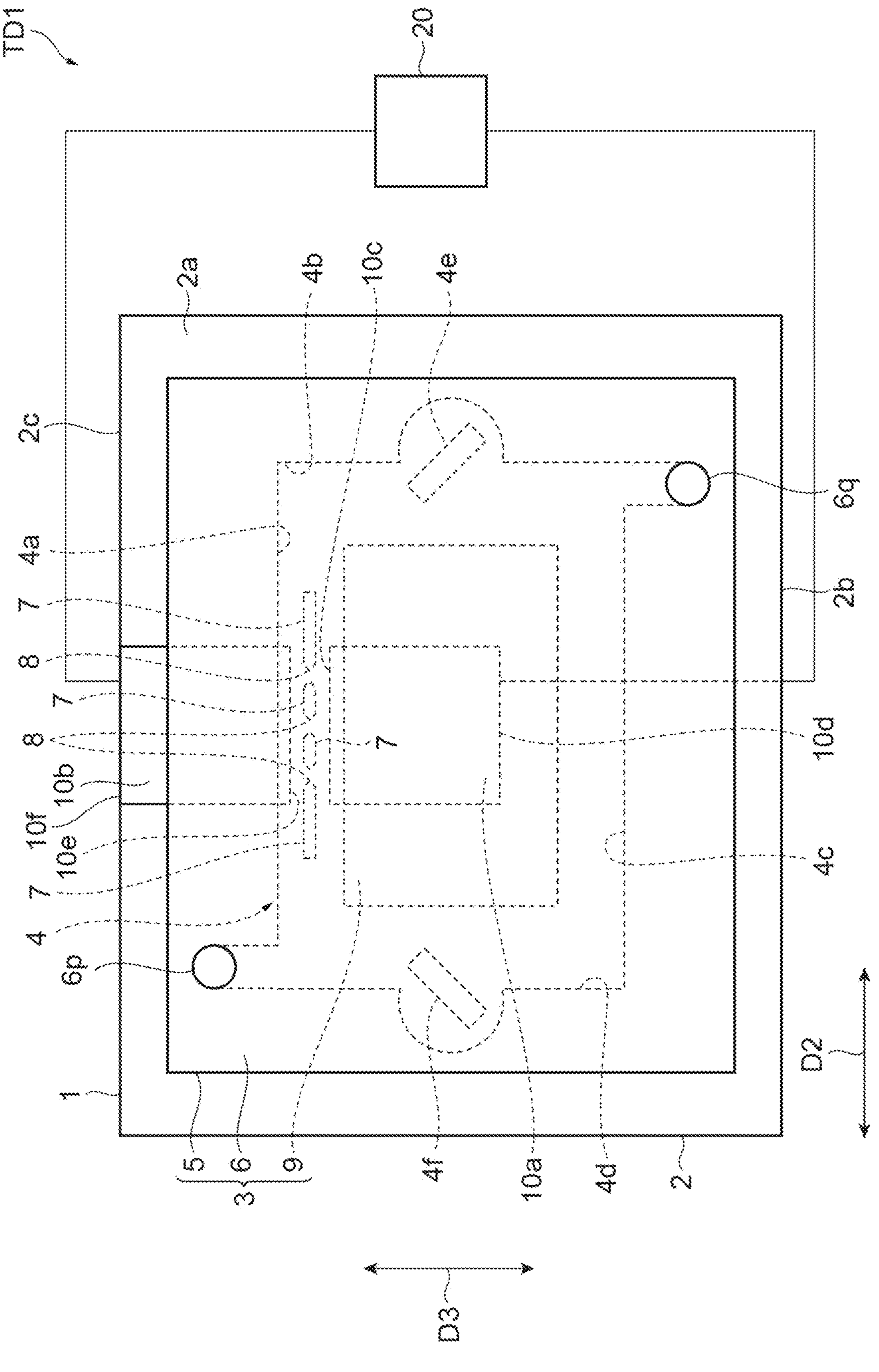
FIG. 7 is a schematic view illustrating a configuration of a microparticle analysis device according to a second embodiment.

The configuration of a microparticle analysis device according to the second embodiment will be described with reference to FIG. 7. FIG. 7 is a schematic view illustrating the configuration of the microparticle analysis device according to the second embodiment when viewed in a first direction D1. In the second embodiment, the liquid including a microparticle is the same as the suspension of the first embodiment. A microparticle analysis device AD1 includes a microparticle trapping device TD1. First, the configuration of the microparticle trapping device TD1 will be described.

The microparticle trapping device TD1 includes a housing 1 and electrodes 10*a* and 10*b*. The housing 1 includes a base 2 and a wall 3. The base 2 and the wall 3 are coupled to each other. In the housing 1, a fluid channel 4 is formed with the base 2 and the wall 3. The fluid channel 4 is defined by the housing 1. In the present embodiment, the fluid channel 4 is a flow path surrounded with the base 2 and the wall 3. The fluid channel 4 is defined inside the base 2 and the wall 3. The base 2 and the wall 3 define the fluid channel 4. The wall 3 includes a side wall 5, an upper wall 6, and an inner wall 9. The side wall 5, the upper wall 6, and the inner wall 9 are coupled to one another. The fluid channel 4 forms a circulation path circulating around the inner wall 9 when viewed in the first direction D1. The side wall 5 surrounds the inner wall 9 with the fluid channel 4 interposed between the side wall 5 and the inner wall 9. The upper wall 6 is opposed to the base 2 in the first direction D1. The base 2 and the wall 3 surround the fluid channel 4 when viewed in the second direction D2 or the third direction D3.

The side wall 5, the upper wall 6, and the inner wall 9 are formed separately from each other, for example. The side wall 5, the upper wall 6, and the inner wall 9 are bonded to each other with an adhesive, for example. The side wall 5, the upper wall 6, and the inner wall 9 may be integrally formed with one another. The base 2 and the wall 3 are formed separately from each other, for example. The base 2 and the wall 3 are bonded to each other with an adhesive, for example. The base 2 and the wall 3 may be integrally formed with each other. The wall 3 includes, for example, an insulating material. The insulating material of the wall 3 includes, for example, silicone rubber. In the upper wall 6, for example, an injection port 6*p* and a drain port 6*q* are formed. A suspension is injected into the fluid channel 4 from the outside of the housing 1 through an injection port 6*p*. The suspension is drained from the fluid channel 4 to the outside of the housing 1 through a drain port 6*q*.

The base 2 includes, for example, an insulating material. The insulating material of the base 2 includes, for example, glass. The glass includes, for example, a glass slide. The base 2 has, for example, a rectangular parallelepiped shape. A thickness of the base 2 is, for example, 1 mm. A length of the base 2 in the second direction D2 is, for example, 38 mm. A length of the base 2 in a third direction D3 is, for example, 26 mm.

The fluid channel 4 includes a first part 4*a*, a second part 4*b*, a third part 4*c*, and a fourth part 4*d*. The first part 4*a* and the third part 4*c* are disposed in the second direction D2. The first part 4*a* and the third part 4*c* couple the second part 4*b* and the fourth part 4*d*. The second part 4*b* and the fourth part 4*d* are disposed in the third direction D3. The second part 4*b* and the fourth part 4*d* couple the first part 4*a* and the third part 4*c*. The suspension from the injection port 6*p* is injected into the first part 4*a*, for example. A stir bar 4*e* is disposed in the second part 4*b*. A stir bar 4*f* is disposed in the fourth part 4*d*. The stir bars 4*e* and 4*f* include, for example, a magnetic rotor. The suspension injected into the first part 4*a* flows to the second part 4*b* due to rotation of the stir bars 4*e* and 4*f*, for example. The suspension having flowed to the second part 4*b* flows to the fourth part 4*d* via the third part 4*c* due to rotation of the stir bars 4*e* and 4*f*, for example. The suspension having flowed to the fourth part 4*d* flows again to the first part 4*a* due to rotation of the stir bars 4*e* and 4*f*, for example. In the fluid channel 4, the suspension circulates in the order of the first part 4*a*, the second part 4*b*, the third part 4*c*, and the fourth part 4*d*, for example.

While the suspension circulates in the fluid channel 4, for example, the opening of the injection port 6*p* and the opening of the drain port 6*q* are closed. In this case, the microparticle is trapped more efficiently from the entire suspension injected into the fluid channel 4. While the suspension circulates in the fluid channel 4, a fresh suspension may not be injected i into n the fluid channel 4. While the suspension circulates in the fluid channel 4, the opening of the injection port 6*p* and the opening of the drain port 6*q* may be opened. While the suspension circulates in the fluid channel 4, a fresh suspension may be injected into the fluid channel 4. In the fluid channel 4, the suspension circulates in the order of the fourth part 4*d*, the third part 4*c*, the second part 4*b*, and the first part 4*a*, for example.

Lengths of the first part 4*a*, the second part 4*b*, the third part 4*c*, and the fourth part 4*d* in the first direction D1 may be equal to one another, and are, for example, 0.5 mm. The lengths of the first part 4*a* and the third part 4*c* in the second direction D2 may be equal to each other, and are, for example, 15 mm. The lengths of the first part 4*a* and the third part 4*c* in the third direction D3 may be equal to each other, and are, for example, 1 mm. The lengths of the second part 4*b* and the fourth part 4*d* in the third direction D3 may be equal to each other, and are, for example, 11 mm. The lengths of the second part 4*b* and the fourth part 4*d* in the second direction D2 may be equal to each other, and are, for example, 1 mm except for a region where the stir bars 4*e* and 4*f* are disposed.

A partition wall 7 is disposed on the wall 3. The partition wall 7 is positioned in the fluid channel 4. In the present embodiment, the wall 3 includes the partition wall 7 in the first part 4*a*. The configuration of the partition wall 7 is the same as that of the partition wall 7 according to the first embodiment, for example. The configuration of the opening 8 is also the same as that of the opening 8 according to the first embodiment, for example.

The electrodes 10*a* and 10*b* are opposed to each other in the third direction D3. In the present embodiment, the electrodes 10*a* and 10*b* are disposed on the surface 2*a* and are opposed to each other in the third direction D3. In the electrodes 10*a* and 10*b*, an end edge 10*c* is exposed to the inside of the first part 4*a*. An end edge 10*d* is exposed to the outside of the first part 4*a*. The end edge 10*d* is separated from the end edge 2*b*. The end edge 10*e* is exposed to the inside of the first part 4*a*. The end edge 10*f* is exposed to the outside of the first part 4*a* and touches the end edge 2*c*.

The electrodes 10*a* and 10*b* include, for example, a metal film. The metal film includes, for example, an aluminum film. The metal film is formed through, for example, a vapor deposition method. The electrodes 10*a* and 10*b* have, for example, a rectangular shape when viewed in the first direction D1. Thicknesses of the electrodes 10*a* and 10*b* are, for example, 100 nm. The electrodes 10*a* and 10*b* are separated from each other, for example, in the third direction D3. An interval between the electrodes 10*a* and 10*b* in the third direction D3 is, for example, 400 μm. Lengths of the electrodes 10*a* and 10*b* in the third direction D3 are, for example, 7.8 mm. Lengths of the electrodes 10*a* and 10*b* in the second direction D2 are, for example, 5 mm. In the present embodiment, the partition wall 7 divides the first part 4*a* into equal halves in the third direction D3, for example. The electrodes 10*a* and 10*b* are arranged symmetrically to each other with respect to the partition wall 7, for example, when viewed in the second direction D2. The electrodes 10*a* and 10*b* are electrically connected to a control unit 20. The control unit 20 applies a voltage to the electrodes 10*a* and 10*b*, for example. Due to the application of the voltage from the control unit 20, the electrodes 10*a* and 10*b* generates an electric field in the first part 4*a* of the fluid channel 4.

Figure 8:
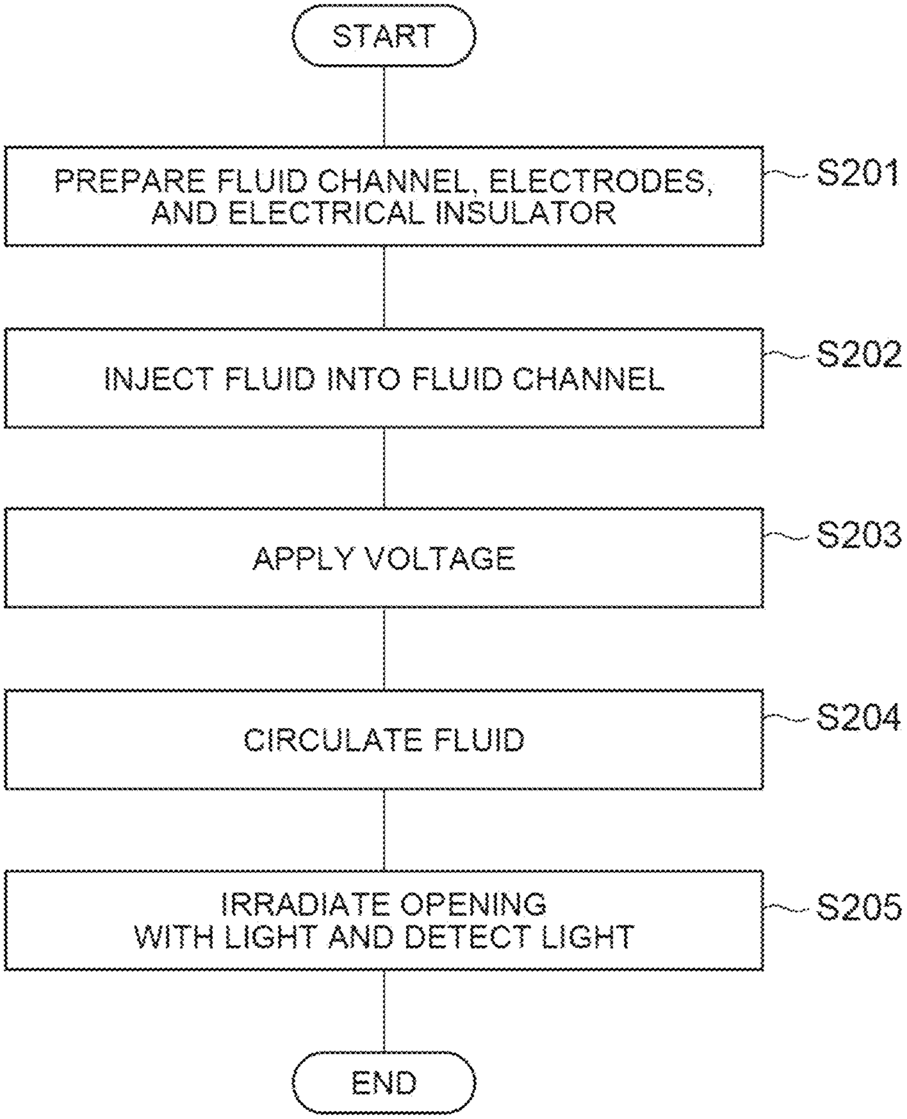
FIG. 8 is a flowchart illustrating a microparticle analysis method according to the second embodiment.

The microparticle analysis method according to the second embodiment will be described with reference to FIG. 8. FIG. 8 is a flowchart illustrating a microparticle analysis method according to the second embodiment. In the present embodiment, the microparticle analysis method includes a microparticle trapping method. The configuration of the microparticle analysis device AD1 of the present embodiment is the same as the configuration of the microparticle analysis device AD1 according to the first embodiment, for example, except for the microparticle trapping device TD1.

The microparticle trapping method will be described. In the microparticle trapping method, first, the fluid channel 4, the electrodes 10*a* and 10*b*, and the partition wall 7 are prepared (S201). In the housing 1, the partition wall 7 is disposed such that at least one opening 8 is formed between the electrodes 10*a* and 10*b* in the first part 4*a*. Next, a fluid including the microparticle is injected into the fluid channel 4 (S202). The fluid is a suspension including the polystyrene bead, for example.

A voltage is applied to the electrodes 10*a* and 10*b* at any timings of the same time as the injection of the suspension in the fluid channel 4, before the injection of the suspension in the fluid channel 4, or after the injection of the suspension in the fluid channel 4 (S203). In the present embodiment, a voltage is applied to the electrodes 10*a* and 10*b* so that an inhomogeneous electric field is made through the at least one opening 8 between the electrodes 10*a* and 10*b* in the fluid channel 4. For example, an alternating-current voltage with a frequency of 1 MHz is applied to the electrodes 10*a* and 10*b*. A magnitude of the applied voltage is, for example, 70 Vpp. In the present embodiment, the voltage is applied to the electrodes 10*a* and 10*b* so that a positive dielectrophoretic force affects the fluid including the microparticle. The polystyrene bead in the suspension are affected due to the positive dielectrophoretic force, for example, and are trapped around the opening 8. The stir bars 4*e* and 4*f* are driven, and the suspension is circulated in the fluid channel 4 (S204). A flow rate of the circulating suspension is, for example, 1.8 mL/h. In the present embodiment, the suspension circulates in the fluid channel 4, and the microparticle in the suspension is trapped more efficiently around the opening 8. The procedure S204 may be performed at any timings of the same time as the procedure S203, before the procedure S203, or after the procedure S203.

The microparticle analysis method will be described. In the microparticle analysis method, the opening 8 is irradiated with light and the light irradiated around the opening 8 is detected (S205). In the microparticle analysis method, the polystyrene bead trapped around the opening 8 is irradiated with the light L1. The light irradiation unit 30 is driven, and the polystyrene bead trapped around the opening 8 is irradiated with the light L1. The light detection unit 35 is driven, and the light detection unit 35 detects the light F1 emitted from the polystyrene bead. In the present embodiment, the light detection unit 35 detects the fluorescence from the polystyrene bead emitted due to the irradiation with the light L1.

In the present embodiment, the fluid including the microparticle may be a suspension other than the suspension including polystyrene bead. The fluid including the microparticle includes, for example, a suspension in which rotavirus is included in ultrapure water or a suspension including tobacco mosaic virus (TMV) and herpes simplex virus type 1 (HSV).

Third Embodiment

Figure 9:
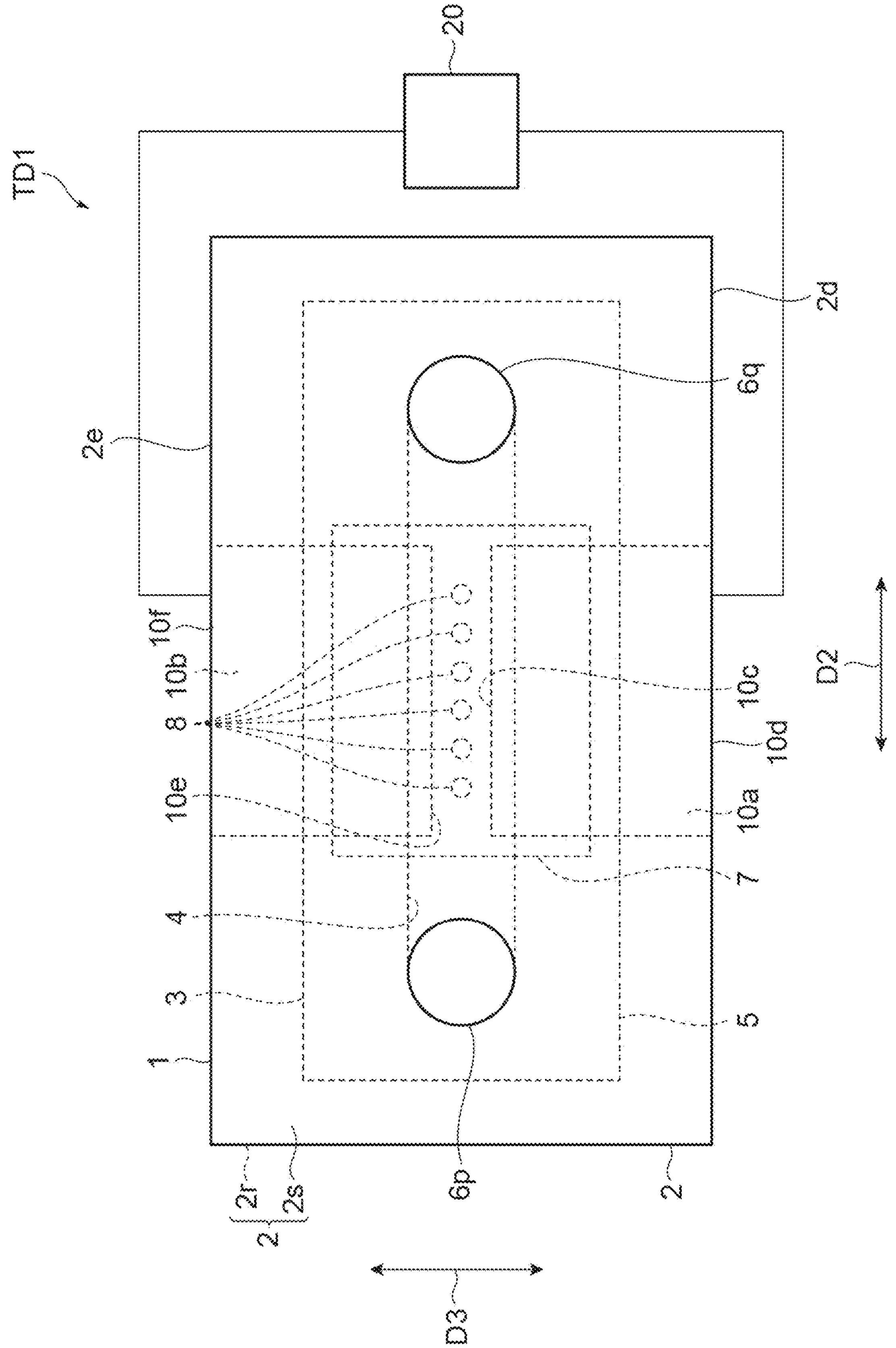
FIG. 9 is a schematic view illustrating a configuration of a microparticle analysis device according to a third embodiment.
Figure 10:
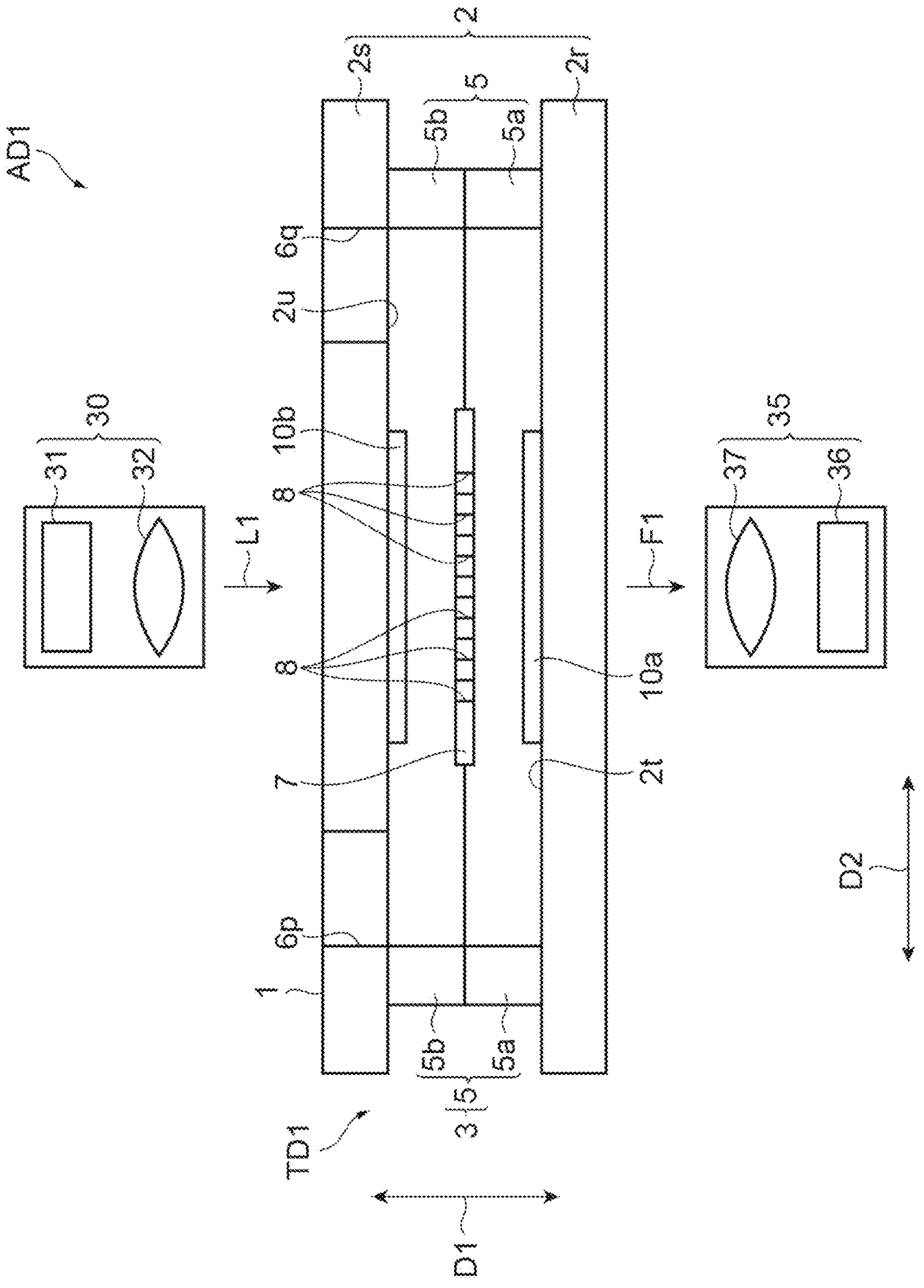
FIG. 10 is a schematic view illustrating a cross-sectional configuration of the microparticle analysis device according to the third embodiment.
Figure 11:
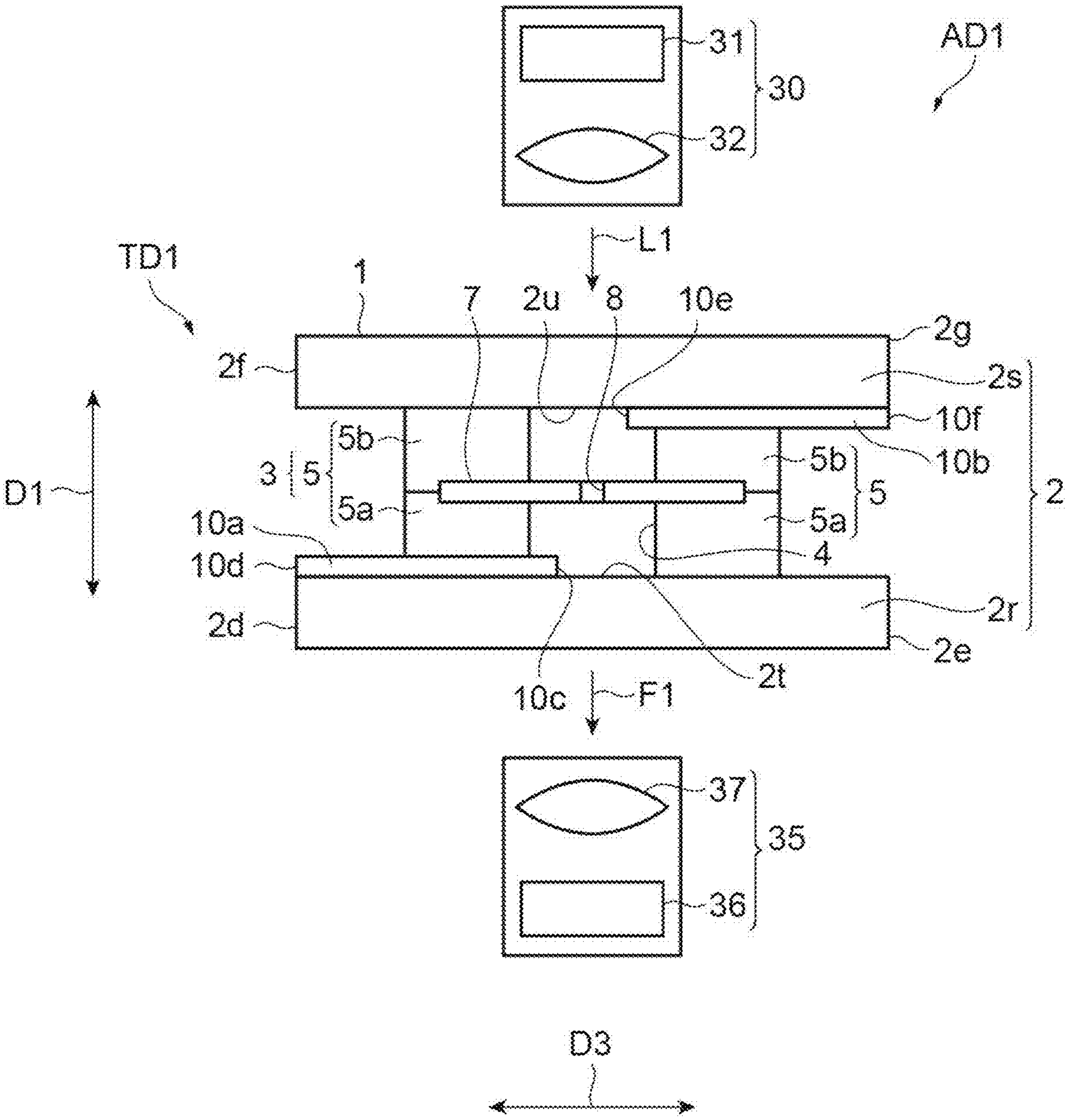
FIG. 11 is a schematic view illustrating a cross-sectional configuration of the microparticle analysis device according to the third embodiment.

The configuration of the microparticle analysis device according to the third embodiment will be described with reference to FIGS. 9 to 11. FIG. 9 is a schematic view illustrating the configuration of the microparticle analysis device according to the third embodiment when viewed in the first direction. FIG. 10 is a schematic view illustrating a cross-sectional configuration of the microparticle analysis device according to the third embodiment when viewed in the third direction. FIG. 11 is a schematic view illustrating a cross-sectional configuration of the microparticle analysis device according to the third embodiment when viewed in the second direction.

A microparticle analysis device AD1 includes a microparticle trapping device TD1. The configuration of the microparticle trapping device TD1 will be described. The microparticle trapping device TD1 includes a housing 1 and electrodes 10*a* and 10*b*. The housing 1 includes a pair of bases 2 and a wall 3. The pair of bases 2 and the wall 3 are coupled to each other. The wall 3 includes a side wall 5. The pair of bases 2 includes a base 2*r* and a base 2*s*. The base 2*r* and the base 2*s* are opposed to each other with the side wall 5 interposed between the base 2*r* and the base 2*s* in the first direction D1. The base 2*r*, the side wall 5, and the base 2*s* are arranged in the first direction D1. The base 2*r*, the side wall 5, and the base 2*s* are coupled to one another. In the housing 1, the fluid channel 4 is defined by the bases 2*r* and 2*s* and the side wall 5. The fluid channel 4 is defined by the housing 1. In the present embodiment, the fluid channel 4 is a flow path surrounded with the bases 2*r* and 2*s* and the side wall 5. The bases 2*r* and 2*s* and the side wall 5 define the fluid channel 4. The side wall 5 surrounds the fluid channel 4 when viewed in the first direction D1. The bases 2*r* and 2*s* and the side wall 5 surround the fluid channel 4 when viewed in the second direction D2 and the third direction D3.

In the fluid channel 4, the suspension flows, for example, in the second direction D2. The suspension flows to fill at least a part of the fluid channel 4. The bases 2*r* and 2*s* and the side wall 5 are formed separately from each other, for example. The bases 2*r* and 2*s* and the side wall 5 are bonded to each other with an adhesive, for example. The bases 2*r* and 2*s* and the side wall 5 may be integrally formed with one another.

In the base 2*s* of the pair of bases 2, an injection port 6*p* and a drain port 6*q* are formed. In the present embodiment, the injection port 6*p* and the drain port 6*q* have the same configuration as that of the injection port 6*p* and the drain port 6*q* according to the first embodiment, for example. The bases 2*r* and 2*s* have the same size and material as those of the base 2 according to the first embodiment, for example. The side wall 5 includes, for example, an insulating material. The insulating material of the side wall 5 includes, for example, silicone rubber. The fluid channel 4 has the same size as the fluid channel 4 according to the first embodiment, for example. The suspension of the present embodiment is the same as the suspension of the first embodiment.

A partition wall 7 is disposed on the wall 3. The partition wall 7 is held with the side wall 5. The side wall 5 includes a first side wall 5*a* and a second side wall 5*b*. The first side wall 5*a* and the second side wall 5*b* hold the partition wall 7 between the first side wall 5*a* and the second side wall 5*b* in the first direction D1. The first side wall 5*a* and the second side wall 5*b* are arranged in the first direction D1. The partition wall 7 is disposed in the third direction D3 inside the fluid channel 4 to couple both side portions of the fluid channel 4 in the third direction D3. In a region excluding the injection port 6*p* and the drain port 6*q*, for example, the partition wall 7 is disposed in the second direction D2 in the fluid channel 4. The partition wall 7 is disposed in a center region of the fluid channel 4, for example, when viewed in the third direction D3. The partition wall 7 separates the center region of the fluid channel 4 in the first direction D1. The partition wall 7 divides the fluid channel 4 into equal halves in the first direction D1, for example. In the partition wall 7, at least one opening 8 is formed between the electrodes 10*a* and 10*b* in the fluid channel 4 when viewed in the first direction D1. In the present embodiment, six openings 8 are formed in the partition wall 7. The six openings 8 are arranged in the second direction D2. The opening 8 has a circular shape when viewed in the first direction D1, for example. The six openings 8 are arranged to divide the fluid channel 4 into equal halves in the third direction D3, for example, when viewed in the first direction D1.

The partition wall 7 includes, for example, an insulating material. In the present embodiment, the partition wall 7 is made of an insulating film including an insulating material. The insulating film includes, for example, an epoxy resin sheet or a polyimide sheet. The epoxy resin sheet includes, for example, a SU-8 (registered trademark) photoresist sheet. The polyimide sheet includes, for example, a Kapton (registered trademark) sheet.

The SU-8 photoresist sheet is formed through the following method, for example. That is, first, a sacrifice layer is coated on a silicon wafer substrate through a spin coating method. Next, the SU-8 photoresist sheet is formed on the sacrifice layer through the spin coating method. Next, an opening is formed in the SU-8 photoresist sheet due to photolithography. The formed opening has, for example, a circular shape. In a case where the opening has a circular shape, the diameter of the opening is, for example, 5 μm. After formation of the opening, the sacrifice layer is dissolved, and as a result of dissolution, the SU-8 photoresist sheet is stripped off from the silicon wafer substrate. After stripping off from the silicon wafer substrate, the SU-8 photoresist sheet is formed. The insulating film is bonded to the side wall 5 with an adhesive, for example. The Kapton sheet is formed by a method similar to the formation method for the SU-8 photoresist sheet, for example.

The electrodes 10*a* and 10*b* are disposed to include a region where the electrodes 10*a* and 10*b* are opposed to each other in the first direction D1. The electrode 10*a* is disposed on a surface 2*t* inside the base 2*r*. The electrode 10*b* is disposed on a surface 2*u* inside the base 2*s*. The electrode 10*a* includes a pair of end edges 10*c* and 10*d*. The end edges 10*c* and 10*d* define both ends of the electrode 10*a* in the third direction D3. The end edge 10*c* is exposed to the inside of the fluid channel 4. The end edge 10*c* is separated from the end edge 2*e* of the base 2*r*. The end edge 10*d* is exposed to the outside of the fluid channel 4 and touches an end edge 2*d* of the base 2*r*, for example. The end edges 2*d* and 2*e* define both ends of the base 2*r* in the third direction D3. The electrode 10*b* includes a pair of end edges 10*e* and 10*f*. The end edges 10*e* and 10*f* define both ends of the electrode 10*b* in the third direction D3. The end edge 10*e* is exposed to the inside of the fluid channel 4. The end edge 10*e* is separated from the end edge 2*f* of the base 2*s*. The end edge 10*f* is exposed to the outside of the fluid channel 4 and touches an end edge 2*g* of the base 2*s*, for example. The end edges 2*f* and 2*g* define both ends of the base 2*s* in the third direction D3.

Thicknesses of the electrodes 10*a* and 10*b* are, for example, 100 nm. When viewed in the second direction D2 and the third direction D3, the electrodes 10*a* and 10*b* are separated from each other by 400 μm in the first direction D1. Lengths of the electrodes 10*a* and 10*b* in the second direction D2 are, for example, 10 mm. An interval between the electrodes 10*a* and 10*b* in the third direction D3 when viewed in the first direction D1 is, for example, 200 μm. Lengths of the electrodes 10*a* and 10*b* in the third direction D3 are, for example, 12.9 mm. In the present embodiment, the partition wall 7 divides the fluid channel 4 into equal halves in the first direction D1, for example. The electrodes 10*a* and 10*b* are arranged, for example, symmetrically with respect to a virtual center point on the partition wall 7, for example, when viewed in the second direction D2. The electrodes 10*a* and 10*b* are electrically connected to a control unit 20. The control unit 20 applies a voltage to the electrodes 10*a* and 10*b*. Due to the application of the voltage, the electrodes 10*a* and 10*b* generate an electric field in the fluid channel 4.

Due to the application of the voltage, the electrodes 10*a* and 10*b* generate an electric field in the third direction D3, for example. The electric field generated at the electrodes 10*a* and 10*b* passes through the opening 8. In a case where the opening 8 has a circular shape, a diameter of the opening 8 is smaller than a length of the electrodes 10*a* and 10*b* in the second direction D2. The partition wall 7 excluding the opening 8 blocks the penetration of the electric field. The electric field generated between the electrodes 10*a* and 10*b* is concentrated around the opening 8. An inhomogeneous electric field is made between the electrodes 10*a* and 10*b*. In the present embodiment, the partition wall 7 is disposed between the electrodes 10*a* and 10*b* so that an inhomogeneous electric field is made around the opening 8. The inhomogeneous electric field is made between the electrodes 10*a* and 10*b* in the fluid channel 4.

In a case where the opening 8 has a circular shape, the diameter of the opening 8 is, for example, 5 μm. Thickness of the partition wall 7 excluding the end portion defining the opening 8 is, for example, 50 μm. A distance between the openings 8 in the second direction D2 is, for example, 200 μm. In the present embodiment, the opening 8 may have a rectangular shape or an elliptical shape when viewed in the first direction D1.

In the present embodiment, an alternating-current voltage with a frequency of 1 MHz is applied to the electrodes 10*a* and 10*b*. The magnitude of the applied voltage is, for example, 70 Vpp. In the present embodiment, a voltage is applied to the electrodes 10*a* and 10*b* so that a positive dielectrophoretic force affects a fluid including the microparticle. The polystyrene bead in the suspension is affected due to a positive dielectrophoretic force, for example, and are trapped around the opening 8. In the present embodiment, the microparticle analysis device AD1 including the same configuration as that of the microparticle analysis device AD1 according to the first embodiment, for example, performs the same microparticle analysis as that of the first embodiment. The light irradiation unit 30 irradiates the polystyrene bead trapped around the opening 8 with the light L1. The light detection unit 35 detects the light F1 emitted from the polystyrene bead.

The fluid including the microparticle may include a suspension other than the suspension including the polystyrene bead. The fluid including the microparticle includes, for example, a suspension in which rotavirus is included in ultrapure water or a suspension including tobacco mosaic virus (TMV) and herpes simplex virus type 1 (HSV).

Fourth Embodiment

Figure 12:
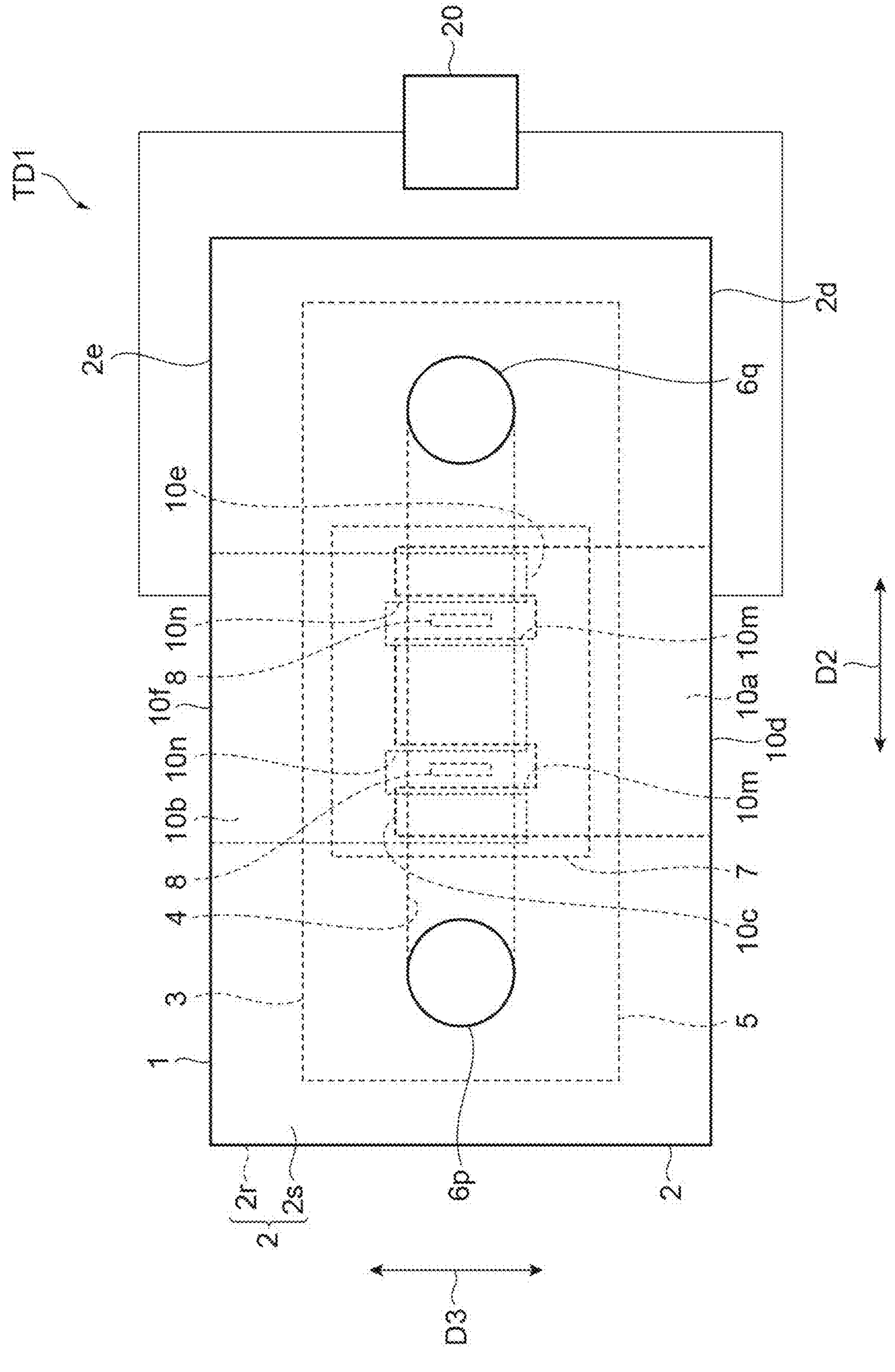
FIG. 12 is a schematic view illustrating a configuration of a microparticle analysis device according to a fourth embodiment.
Figure 13:
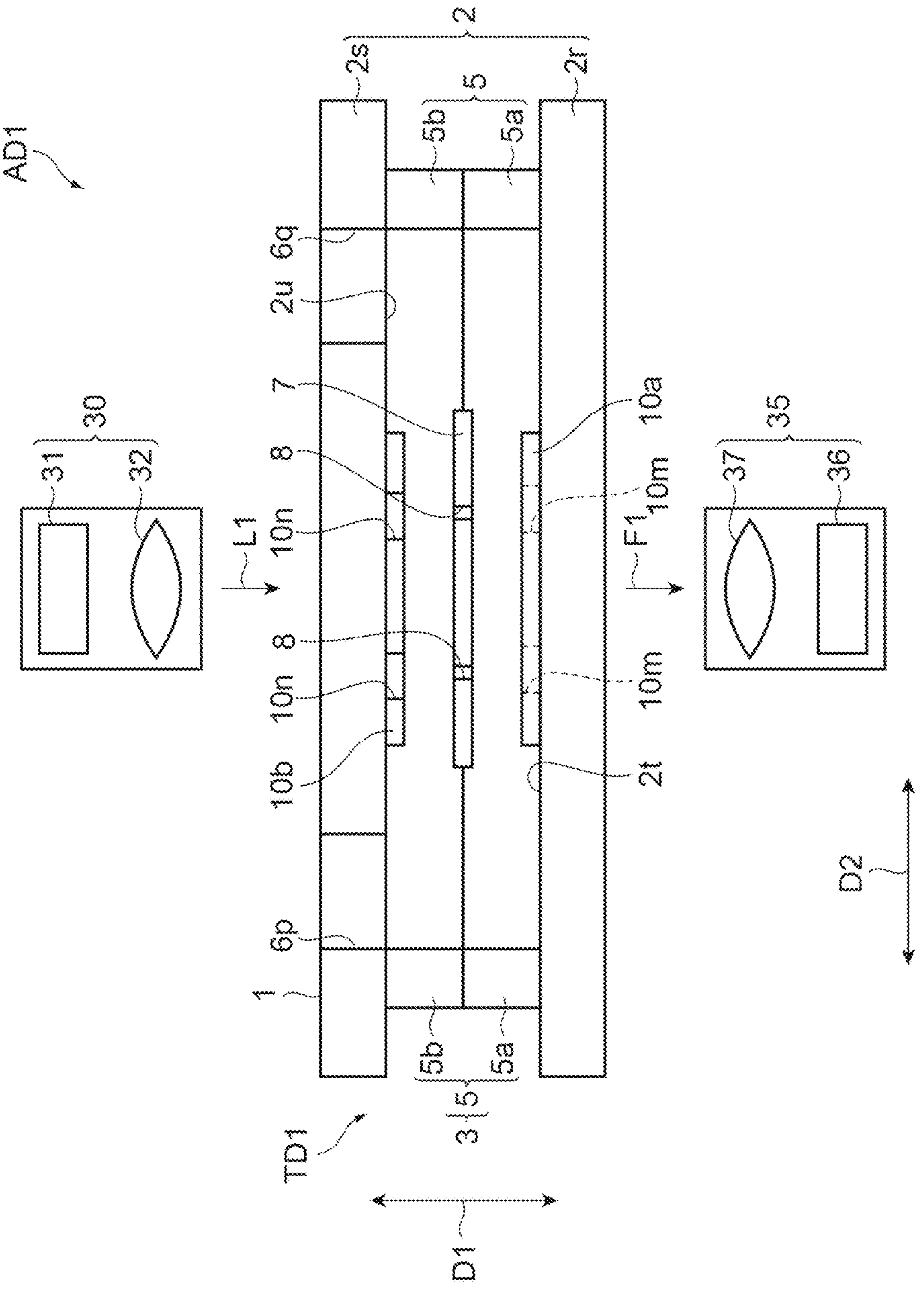
FIG. 13 is a schematic view illustrating a cross-sectional configuration of the microparticle analysis device according to the fourth embodiment.
Figure 14:
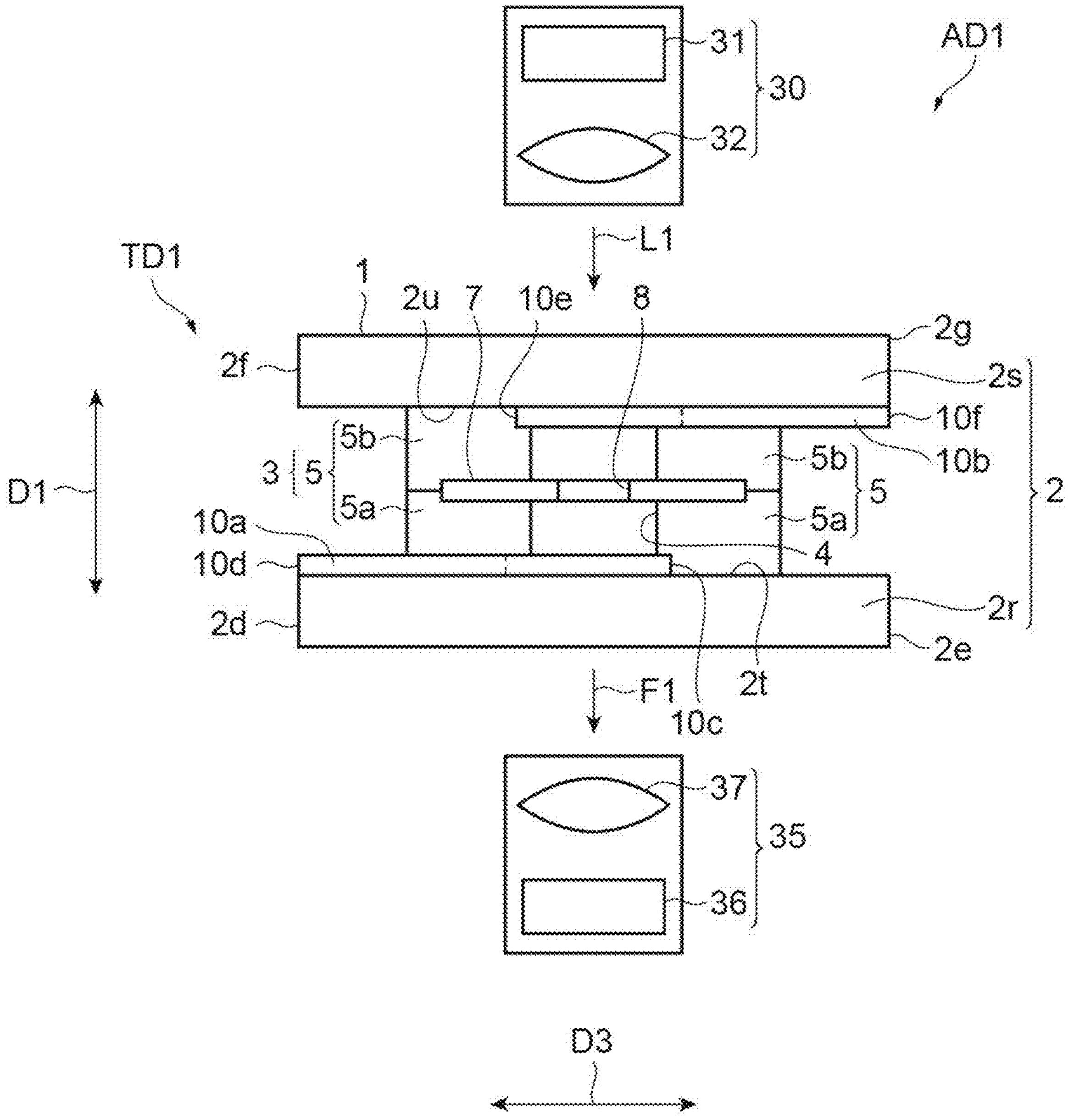
FIG. 14 is a schematic view illustrating a cross-sectional configuration of the microparticle analysis device according to the fourth embodiment.

The configuration of the microparticle analysis device according to the fourth embodiment will be described with reference to FIGS. 12 to 14. FIG. 12 is a schematic view illustrating the configuration of the microparticle analysis device according to the fourth embodiment when viewed in the first direction. FIG. 13 is a schematic view illustrating a cross-sectional configuration of the microparticle analysis device according to the fourth embodiment when viewed in the third direction. FIG. 14 is a schematic view illustrating a cross-sectional configuration of the microparticle analysis device according to the fourth embodiment when viewed in the second direction. A microparticle analysis device AD1 includes a microparticle trapping device TD1.

The configuration of the microparticle trapping device TD1 will be described. The microparticle trapping device TD1 includes a housing 1 and electrodes 10*a* and 10*b*. The housing 1 includes a pair of bases 2 and a wall 3. The pair of bases 2 and the wall 3 are coupled to each other. The wall 3 includes a side wall 5. The pair of bases 2 includes a base 2*r* and a base 2*s*, and the base 2*r* and the base 2*s* are opposed to each other with the side wall 5 interposed between the base 2*r* and the base 2*s* in the first direction D1. The base 2*r*, the side wall 5, and the base 2*s* are arranged in the first direction D1 and are coupled to one another. In the housing 1, the fluid channel 4 is defined by the bases 2*r* and 2*s* and the side wall 5. The fluid channel 4 is defined by the housing 1. In the present embodiment, the fluid channel 4 includes a flow path surrounded with the bases 2*r* and 2*s* and the side wall 5. The bases 2*r* and 2*s* and the side wall 5 define the fluid channel 4. The side wall 5 surrounds the fluid channel 4 when viewed in the first direction D1. The bases 2*r* and 2*s* and the side wall 5 surround the fluid channel 4 when viewed in the second direction D2 and the third direction D3.

In the fluid channel 4, the suspension flows, for example, in the second direction D2. The suspension flows to fill at least a part of the fluid channel 4. The bases 2*r* and 2*s* and the side wall 5 are formed separately from each other, for example. The bases 2*r* and 2*s* and the side wall 5 are bonded to each other with an adhesive, for example. The bases 2*r* and 2*s* and the side wall 5 may be integrally formed with one another.

In the base 2*s* of the pair of bases 2, an injection port 6*p* and a drain port 6*q* are formed. The injection port 6*p* and the drain port 6*q* have the same configuration as that of the injection port 6*p* and the drain port 6*q* according to the first embodiment, for example. The bases 2*r* and 2*s* have the same material and size as those of the base 2 according to the first embodiment, for example. The side wall 5 includes, for example, an insulating material. The insulating material of the side wall 5 includes, for example, silicone rubber. The fluid channel 4 has the same size as the fluid channel 4 according to the first embodiment, for example.

A partition wall 7 is disposed on the wall 3. The partition wall 7 is held with the side wall 5. The side wall 5 includes a first side wall 5*a* and a second side wall 5*b*. The first side wall 5*a* and the second side wall 5*b* hold the partition wall 7 between the first side wall 5*a* and the second side wall 5*b* in the first direction D1. The first side wall 5*a* and the second side wall 5*b* are arranged in the first direction D1. The partition wall 7 is disposed in the third direction D3 inside the fluid channel 4 to couple both side portions of the fluid channel 4 in the third direction D3. In a region excluding the injection port 6*p* and the drain port 6*q*, for example, the partition wall 7 is disposed in the fluid channel 4 in the second direction D2. The partition wall 7 is disposed in a center region of the fluid channel 4, for example, when viewed in the third direction D3. The partition wall 7 separates the center region of the fluid channel 4 in the first direction D1, for example. The partition wall 7 divides the fluid channel 4 into equal halves in the first direction D1, for example. For example, two openings 8 are formed in the partition wall 7. The two openings 8 are arranged in the second direction D2, for example. When viewed in the first direction D1, the opening 8 has a slit shape formed in the third direction D3.

The opening 8 has, for example, a circular shape or a rectangular shape when viewed in the first direction D1. The number of the openings 8 is one or plural. In a case where the number of the openings 8 is plural, the plurality of openings 8 are arrayed in the third direction D3, for example. In a case where the plurality of openings 8 have a circular shape, for example, the plurality of openings 8 having a diameter of 1 μm or 5 μm are separated from one another by 200 μm in the third direction D3. The circular shape includes, for example, an elliptical shape or an oval shape in addition to the perfect circular shape.

The partition wall 7 includes, for example, an insulating material. In the present embodiment, the partition wall 7 is made of an insulating film including an insulating material. The insulating film is a sheet made of the same material as that of the insulating film of the third embodiment, for example. The partition wall 7 is bonded to the side wall 5 with an adhesive, for example.

The electrodes 10*a* and 10*b* are disposed to include a region where the electrodes 10*a* and 10*b* are opposed to each other in the first direction D1. The electrode 10*a* is disposed on a surface 2*t* inside the base 2*r* of the pair of bases 2. The electrode 10*b* is disposed on a surface 2*u* inside the base 2*s*. The electrodes 10*a* and 10*b* include, for example, a metal film. The metal film includes, for example, an aluminum film. The metal film is formed through, for example, a vapor deposition method. The electrodes 10*a* and 10*b* have, for example, a comb shape when viewed in the first direction D1.

The electrode 10*a* includes a pair of end edges 10*c* and 10*d*. The end edges 10*c* and 10*d* define both ends of the electrode 10*a* in the third direction D3. The electrode 10*a* includes a region including the end edge 10*c* and a region including the end edge 10*d*. The region including the end edge 10*c* includes a plurality of parts separated from one another in the second direction D2, for example. The plurality of parts separated from one another constitutes the region including the end edge 10*c*. In the present embodiment, the region including the end edge 10*c* includes three parts. Each of the three parts includes the end edge 10*c*. The three parts are arranged in the second direction D2. Of the three parts, two parts form outer parts each including an end edge of the electrode 10*a* in the second direction D2. The remaining one part is disposed between the two outer parts in the second direction D2 and is positioned in a center part. A gap 10*m* is formed between the center part and each of the two outer parts. Two gaps 10*m* are formed in the region including the end edge 10*c*.

The region including the end edge 10*c* is continuous with the region including the end edge 10*d* in the third direction D3, for example. The region including the end edge 10*c* and the region including the end edge 10*d* are integrally formed with each other, for example. The region including the end edge 10*d* does not include a plurality of parts separated from one another, for example. One end of the gap 10*m* in the third direction D3 is defined by a region including the end edge 10*d*. Both ends of the gap 10*m* in the second direction D2 are defined by two outer parts adjacent to each other in the second direction D2. The gap 10*m* is separated from the end edge 10*d*.

The electrode 10*a* is exposed to the inside of the fluid channel 4 in a part excluding the end edge 10*c* in the region including the end edge 10*c*. The electrode 10*a* is disposed in the base 2*r* such that the gap 10*m* is exposed in the fluid channel 4. The end edge 10*c* is separated from the end edge 2*e* in the third direction D3. The end edge 10*d* is exposed to the outside of the fluid channel 4 and touches, for example, an end edge 2*d*. The end edges 2*d* and 2*e* define both ends of the base 2*r* in the third direction D3.

The electrode 10*b* includes a pair of end edges 10*e* and 10*f*. The end edges 10*e* and 10*f* define both ends of the electrode 10*b* in the third direction D3. The electrode 10*b* includes a region including the end edge 10*e* and a region including the end edge 10*f*. The region including the end edge 10*e* includes a plurality of parts separated from one another in the second direction D2, for example. The plurality of parts separated from one another constitutes the region including the end edge 10*e*. In the present embodiment, the region including the end edge 10*e* includes three parts. Each of the three parts includes the end edge 10*e*. The three parts are arranged in the second direction D2. Of the three parts, two parts form outer parts each including an end edge of the electrode 10*b* in the second direction D2. The remaining one part is disposed between the two outer parts in the second direction D2 and is positioned in a center part. A gap 10*n* is formed between the center part and each of the two outer parts. Two gaps 10*n* are formed in the region including the end edge 10*e*.

The region including the end edge 10*e* is continuous with the region including the end edge 10*f* in the third direction D3, for example. The region including the end edge 10*e* and the region including the end edge 10*f* are integrally formed with each other, for example. The region including the end edge 10*f* does not include a plurality of parts separated from one another, for example. One end of the gap 10*n* in the third direction D3 is defined by a region including the end edge 10*f*. Both ends of the gap 10*n* in the second direction D2 are defined by two outer parts adjacent to each other in the second direction D2. The gap 10*n* is separated from the end edge 10*f*.

The electrode 10*b* is exposed to the inside of the fluid channel 4 in a part excluding the end edge 10*e* in a region including the end edge 10*e*. The electrode 10*b* is disposed in the base 2*s* such that the gap 10*n* is exposed in the fluid channel 4. The end edge 10*e* is separated from the end edge 2*f* in the third direction D3. The end edge 10*f* is exposed to the outside of the fluid channel 4 and touches, for example, an end edge 2*g*. The end edges 2*f* and 2*g* define both ends of the base 2*s* in the third direction D3.

As illustrated in FIG. 12, the electrodes 10*a* and 10*b* are arranged in the bases 2*r* and 2*s*, respectively, such that the positions of the gap 10*m* and the gap 10*n* substantially coincide with each other, when viewed in the first direction D1. The partition wall 7 is disposed on the bases 2*r* and 2*s* such that the opening 8 overlaps the gap 10*m* and the gap 10*n* when viewed in the first direction D1. In the present embodiment, one gap 10*m* of the two gaps 10*m*, one opening 8 of the two openings 8, and one gap 10*n* of the two gaps 10*n* are arranged in the first direction D1. Another gap 10*m* of the two gaps 10*m*, another opening 8 of the two openings 8, and another gap 10*n* of the two gaps 10*n* are arranged in the first direction D1. For the sake of explanation, FIG. 12 illustrates the electrode 10*a* and the electrode 10*b* intentionally shifted when viewed in the first direction D1. In reality, an outer edge of the electrode 10*a* includes a part overlapping an outer edge of the electrode 10*b* when viewed in the first direction D1.

Thicknesses of the electrodes 10*a* and 10*b* are, for example, 100 nm. Lengths of the gap 10*m* and the gap 10*n* in the third direction D3 are, for example, 4 mm. Lengths of the gap 10*m* and the gap 10*n* in the second direction D2 are, for example, 200 μm. A length between the end edge 10*c* and the end edge 10*d* is, for example, 15 mm. A length between the end edge 10*e* and the end edge 10*f* is, for example, 15 mm. Lengths of the electrode 10*a* and the electrode 10*b* in the second direction D2 are, for example, 10 mm. A thickness between the electrode 10*a* and the electrode 10*b* in the first direction D1 is, for example, 400 μm. In the present embodiment, the partition wall 7 divides the fluid channel 4 into equal halves in the first direction D1, for example. The electrodes 10*a* and 10*b* are arranged, for example, symmetrically with respect to a virtual center point on the partition wall 7, for example, when viewed in the second direction D2. The electrodes 10*a* and 10*b* are electrically connected to a control unit 20. Due to the application of the voltage from the control unit 20, the electrodes 10*a* and 10*b* generates an electric field in the fluid channel 4.

Due to the application of the voltage, the electrodes 10*a* and 10*b* generates an electric field in the fluid channel 4. The electric field generates with the electrodes 10*a* and 10*b* passes through the opening 8. An opening width of the opening 8 in the second direction D2 is smaller than the lengths of the electrodes 10*a* and 10*b* in the second direction D2. The partition wall 7 excluding the opening 8 blocks the penetration of the electric field. The electric field generated between the electrodes 10*a* and 10*b* is concentrated around the opening 8. As a result, an inhomogeneous electric field is made between the electrodes 10*a* and 10*b*. In the present embodiment, the partition wall 7 is disposed between the electrodes 10*a* and 10*b* so that the inhomogeneous electric field is made around the opening 8. The inhomogeneous electric field is made between the electrodes 10*a* and 10*b* in the fluid channel 4.

The two openings 8 have opening widths different from each other, for example. An opening width of one opening 8 of the two openings 8 is, for example, 1 μm. An opening width of another opening 8 is, for example, 5 μm. The interval between the two openings 8 in the second direction D2 is, for example, 5 mm. When viewed in the first direction D1, the opening 8 has, for example, a circular shape or an elliptical shape.

In the fourth embodiment, a suspension including the same tobacco mosaic virus and the herpes simplex virus type 1 as those of the first embodiment is injected into the fluid channel 4. An alternating-current voltage is applied to the electrodes 10*a* and 10*b*. A frequency of the applied voltage is, for example, 1 MHz. A magnitude of the applied voltage is, for example, 70 Vpp. In the present embodiment, a voltage is applied to the electrodes 10*a* and 10*b* so that a positive dielectrophoretic force affects a fluid including the microparticle. The two types of viruses in the suspension are affected due to a positive dielectrophoretic force, for example, and are trapped around the opening 8. As the opening width of the opening 8 decreases, the electric field concentrates more around the opening 8. In the present embodiment, the tobacco mosaic virus is trapped around the two openings 8 having opening widths different from each other, for example. The herpes simplex virus type 1 is trapped around the opening 8 with a small opening width, for example.

In the present embodiment, the microparticle trapped around the opening 8 is irradiated with the light L1, and the light F1 emitted from the microparticle is detected. The light F1 includes, for example, fluorescence. The tobacco mosaic virus is trapped around the two openings 8, for example, and red fluorescence derived from the tobacco mosaic virus is observed around the two openings 8. The herpes simplex virus type 1 is trapped around the opening 8 with the small opening width, for example, and green fluorescence derived from the herpes simplex virus type 1 is observed around the opening 8 having the small opening width. In a case where the two openings 8 having opening widths different from each other are formed, the magnitude of the dielectrophoretic force to trap the virus around the openings 8 is different for each virus, and the virus to be trapped differs for each opening 8.

Fifth Embodiment

Figure 15:
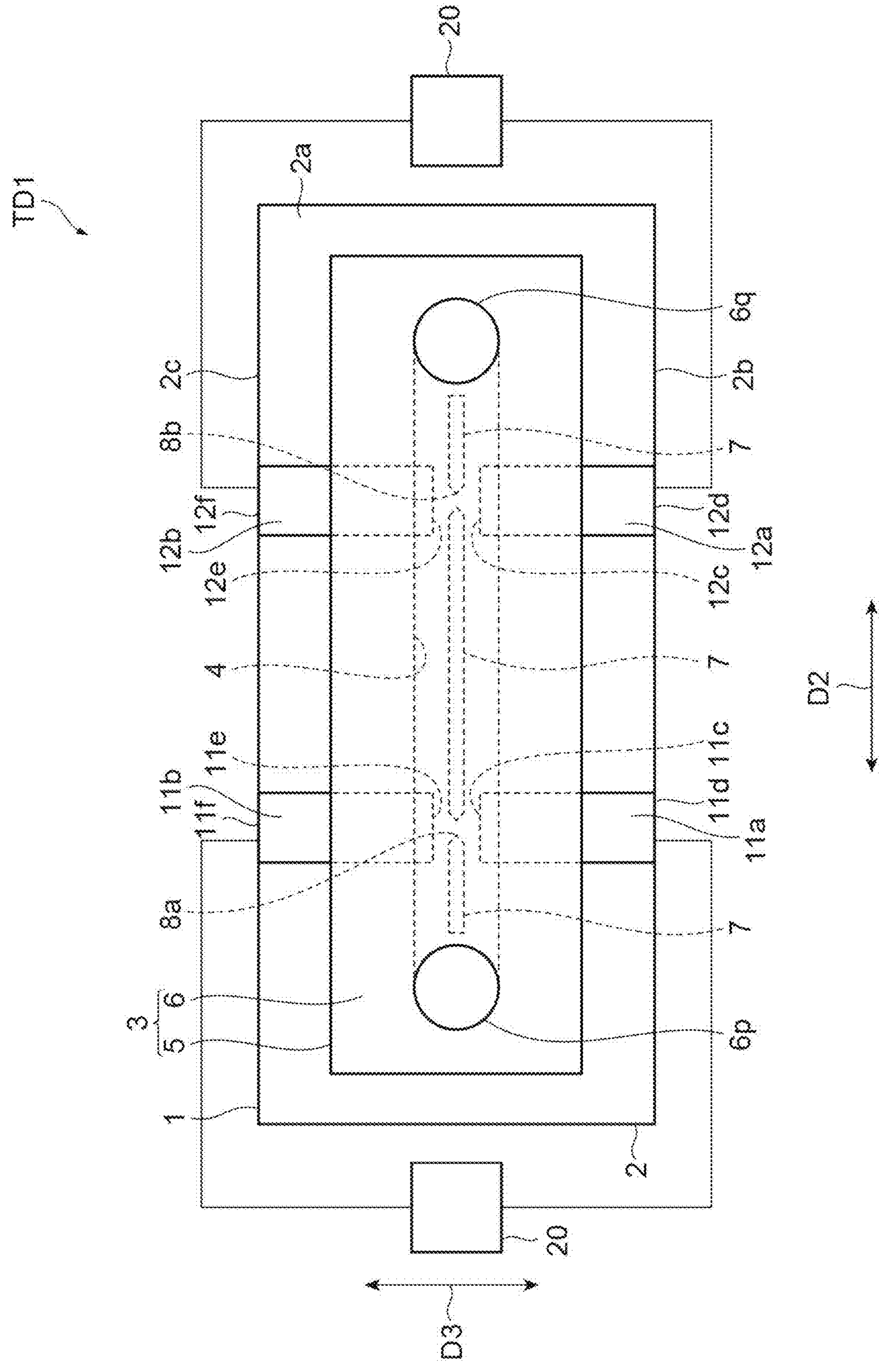
FIG. 15 is a schematic view illustrating a configuration of a microparticle analysis device according to a fifth embodiment.

The configuration of the microparticle analysis device according to the fifth embodiment will be described with reference to FIG. 15. FIG. 15 is a schematic view illustrating the configuration of the microparticle analysis device according to the fifth embodiment when viewed in the first direction. A microparticle analysis device AD1 includes a microparticle trapping device TD1.

The configuration of the microparticle trapping device TD1 will be described. The microparticle trapping device TD1 includes a housing 1, electrodes 11*a* and 11*b*, and electrodes 12*a* and 12*b*. The housing 1 includes a base 2 and a wall 3. The base 2 and the wall 3 are coupled to each other. In the housing 1, a fluid channel 4 is formed by a base 2 and a wall 3. The fluid channel 4 is defined by the housing 1. In the present embodiment, the fluid channel 4 is a flow path surrounded by the base 2 and the wall 3. The fluid channel 4 is defined inside the base 2 and the wall 3. The base 2 and the wall 3 define the fluid channel 4. The suspension flows in the second direction D2 in the fluid channel 4, for example. The suspension flows to fill at least a part of the fluid channel 4. For example, in a case where the electrode 11*a* constitutes the first electrode, the electrode 11*b* constitutes the second electrode. For example, in a case where the electrode 12*a* constitutes the first electrode, the electrode 12*b* constitutes the second electrode.

The base 2 according to the present embodiment has the same size and material as those of the base 2 according to the first embodiment, for example. The fluid channel 4 of the present embodiment has the same size as the fluid channel 4 according to the first embodiment, for example.

The wall 3 includes a side wall 5 and an upper wall 6. The side wall 5 and the upper wall 6 are coupled to each other. The upper wall 6 is opposed to the base 2 in the first direction D1. The side wall 5 surrounds the fluid channel 4 when viewed in the first direction D1. The upper wall 6 is opposed to the base 2 in the first direction D1. The base 2, the side wall 5, and the upper wall 6 surround the fluid channel 4 when viewed in the second direction D2 and the third direction D3. In the upper wall 6, an injection port 6*p* and a drain port 6*q* are formed. The injection port 6*p* and the drain port 6*q* according to the present embodiment have the same configuration as that of the injection port 6*p* and the drain port 6*q* according to the first embodiment, for example. The side wall 5 and the upper wall 6 contain, for example, an insulating material. The insulating material of the side wall 5 and the upper wall 6 includes, for example, silicone rubber.

A partition wall 7 is disposed on the wall 3. The partition wall 7 is positioned in the fluid channel 4. The partition wall 7 is connected to, for example, the upper wall 6. The partition wall 7 extends between the upper wall 6 and the base 2 in the first direction D1, for example. The partition wall 7 is formed on the base 2, for example. In a region excluding the injection port 6*p* and the drain port 6*q*, for example, the partition wall 7 extends in the second direction D2 in the fluid channel 4. The partition wall 7 is disposed in a center region of the fluid channel 4, for example, when viewed in the second direction D2. The partition wall 7 separates the fluid channel 4 in the third direction D3. The partition wall 7 includes an insulating material. The insulating material of the partition wall 7 includes, for example, silicone rubber.

The partition wall 7 is connected to the base 2, for example. The partition wall 7 is integrally formed with the base 2, for example. The partition wall 7 may be formed separately from the base 2. In a case where the partition wall 7 and the base 2 are formed separately from each other, for example, the partition wall 7 and the base 2 are bonded to each other with an adhesive. The partition wall 7 is connected to, for example, the upper wall 6. The partition wall 7 is integrally formed with the upper wall 6, for example. The partition wall 7 may be formed separately from the upper wall 6. In a case where the partition wall 7 and the upper wall 6 are formed separately from each other, for example, the partition wall 7 and the upper wall 6 are bonded to each other with an adhesive. In the present embodiment, the partition wall 7 is connected to at least one of the base 2 and the upper wall 6. The partition wall 7 is held by at least one of the base 2 and the upper wall 6.

For example, two openings 8*a* and 8*b* are formed on the partition wall 7. The openings 8*a* and 8*b* have, for example, a slit shape. The slit-shaped openings 8*a* and 8*b* extend in the first direction D1. The openings 8*a* and 8*b* extend between a surface inside the upper wall 6 and a surface inside the base 2. The openings 8*a* and 8*b* are formed to touch, for example, at least any one of the surface inside the upper wall 6 and the surface inside the base 2. The openings 8*a* and 8*b* may not formed to touch, for example, either the surface inside the upper wall 6 or the surface inside the base 2.

The first and second electrodes 11*a* and 11*b* are opposed to each other in the third direction D3. The electrodes 11*a* and 11*b* are disposed on the surface 2*a* and are opposed to each other in the third direction D3. The electrode 11*a* includes a pair of end edges 11*c* and 11*d*. The end edges 11*c* and 11*d* define both ends of the electrode 11*a* in the third direction D3. The end edge 11*c* is exposed to the inside of the fluid channel 4. The end edge 11*d* is exposed to the outside of the fluid channel 4 and touches, for example, an end edge 2*b*. The electrode 11*b* includes a pair of end edges 11*e* and 11*f*. The end edges 11*e* and 11*f* define both ends of the electrode 11*b* in the third direction D3. The end edge 11*e* is exposed to the inside of the fluid channel 4. The end edge 11*f* is exposed to the outside of the fluid channel 4 and touches, for example, an end edge 2*c*. The end edges 2*b* and 2*c* define both ends of the base 2 in the third direction D3.

The first and second electrodes 12*a* and 12*b* are opposed to each other in the third direction D3. The electrodes 12*a* and 12*b* are disposed on a surface inside the base 2 and are opposed to each other in the third direction D3. The electrode 12*a* includes a pair of end edges 12*c* and 12*d*. The end edges 12*c* and 12*d* define both ends of the electrode 12*a* in the third direction D3. The end edge 12*c* is exposed to the inside of the fluid channel 4. The end edge 12*d* is exposed to the outside of the fluid channel 4 and touches, for example, the end edge 2*b*. The electrode 12*b* includes a pair of end edges 12*e* and 12*f*. The end edges 12*e* and 12*f* define both ends of the electrode 12*b* in the third direction D3. The end edge 12*e* is exposed to the inside of the fluid channel 4. The end edge 12*f* is exposed to the outside of the fluid channel 4 and touches, for example, the end edge 2*c*.

The electrodes 11*a*, 11*b*, 12*a*, and 12*b* contain, for example, a metal film. The metal film includes, for example, aluminum. The metal film is formed by, for example, a vapor deposition method. The electrodes 11*a*, 11*b*, 12*a*, and 12*b* have, for example, a rectangular shape when viewed in the first direction D1. The thicknesses of the electrodes 11*a*, 11*b*, 12*a*, and 12*b* are, for example, 100 nm. The electrodes 11*a* and 11*b* are separated from each other, for example, in the third direction D3. The interval between the electrodes 11*a* and 11*b* in the third direction D3 is, for example, 400 μm. The lengths of the electrodes 11*a* and 11*b* in the third direction D3 are, for example, 12.8 mm. The lengths of the electrodes 11*a* and 11*b* in the second direction D2 are, for example, 5 mm. In the present embodiment, the size of the electrodes 12*a* and 12*b* and the interval between the electrodes are the same as the size of the electrodes 11*a* and 11*b* and the interval between the electrodes, for example. The electrodes 11*a*, 11*b*, 12*a*, and 12*b* are electrically connected to a control unit 20. By the application of the voltage from the control unit 20, the electrodes 11*a*, 11*b*, 12*a*, and 12*b* form an electric field in the fluid channel 4.

In the partition wall 7, at least one of openings 8*a* and 8*b* is formed between the electrodes 11*a* and 11*b* and between the electrodes 12*a* and 12*b* when viewed in the first direction D1. In the present embodiment, one opening 8*a* is formed between the electrodes 11*a* and 11*b*, and one opening 8*b* is formed between the electrodes 12*a* and 12*b*. When viewed in the first direction D1, the opening 8*a* is positioned between the electrodes 11*a* and 11*b* in the third direction D3. When viewed in the first direction D1, the opening 8*b* is positioned between the electrodes 12*a* and 12*b* in the third direction D3. The opening 8*a* overlaps the electrodes 11*a* and 11*b* when viewed in the third direction D3. The opening 8*b* overlaps the electrodes 12*a* and 12*b* when viewed in the third direction D3. A plurality of openings 8*a* and 8*b* may be formed between the electrodes 11*a* and 11*b* and between the electrodes 12*a* and 12*b*, respectively.

The electrodes 11*a* and 11*b* form an electric field, for example, in the third direction D3 by the application of the voltage. The electrodes 12*a* and 12*b* form an electric field, for example, in the third direction D3 by the application of the voltage. The electric field generated with the electrodes 11*a* and 11*b* passes through the opening 8*a*. The electric field formed by the electrodes 12*a* and 12*b* passes through the opening 8*b*. The opening widths of the openings 8*a* and 8*b* in the second direction D2 are smaller than the lengths of the electrodes 11*a*, 11*b*, 12*a*, and 12*b* in the second direction D2. The partition wall 7 excluding the openings 8*a* and 8*b* blocks the penetration of the electric field. The electric field generated between the electrodes 11*a* and 11*b* is concentrated in the opening 8*a*, and an inhomogeneous electric field is made between the electrodes 11*a* and 11*b*. The electric field generated between the electrodes 12*a* and 12*b* is concentrated in the opening 8*b*. As a result, the inhomogeneous electric field is made between the electrodes 12*a* and 12*b*. The opening 8*a* is disposed between the electrodes 11*a* and 11*b* to make the inhomogeneous electric field between the electrodes 11*a* and 11*b*. The opening 8*b* is disposed between the electrodes 12*a* and 12*b* to make the inhomogeneous electric field between the electrodes 12*a* and 12*b*.

The opening widths of the openings 8*a* and 8*b* have a size with which the electric flux density is increased so that the microparticle is trapped around the openings 8*a* and 8*b*. In the present embodiment, opening widths of the openings 8*a* and 8*b* are, for example, 5 μm. Thickness of the partition wall 7 in the third direction D3 excluding the end portions defining the openings 8*a* and 8*b* is, for example, 50 μm. In the present embodiment, the openings 8*a* and 8*b* are arranged in the second direction D2. An interval between the openings 8*a* and 8*b* in the second direction D2 is, for example, 10 mm. The openings 8*a* and 8*b* have, for example, a circular shape when viewed in the third direction D3. The openings 8*a* and 8*b* may have, for example, an elliptical shape when viewed in the third direction D3. The openings 8*a* and 8*b* are positioned in the fluid of the suspension injected into the fluid channel 4.

In the present embodiment, a suspension in which the microparticle including a virus and a cell is suspended is injected into the fluid channel 4. A suspension of the present embodiment includes a rotavirus and an HL-60 cell. The rotavirus is fluorescently labeled with a fluorescent dye, for example. The fluorescent dye includes, for example, Alexa Fluor (registered trademark) 488 5-TFP. The HL-60 cell is fluorescently labeled with Calcein (registered trademark)-AM fluorescent dye, for example. The rotavirus and the HL-60 cell are suspended, for example, in the same sorbitol solution. The concentration of the sorbitol solution is, for example, 280 mM. The electrical conductivity of the suspension is, for example, 10 μS/m. The concentration of the rotavirus in the suspension is, for example, 300 ng/mL. The concentration of the HL-60 cell in the suspension is, for example, $10^5$ cells/mL. An outer diameter of the rotavirus is, for example, 100 nm. An outer diameter of the HL-60 cells is, for example, 10 μm. After the suspension is prepared, the suspension is injected into the fluid channel 4 through the injection port 6*p*.

After injection of the suspension, an alternating-current voltage is applied to the electrodes 11*a* and 11*b* and the electrodes 12*a* and 12*b*. A frequency and magnitude of the voltages applied to the electrodes 11*a* and 11*b* and the electrodes 12*a* and 12*b* are different from each other. The frequency of the voltage applied to the electrodes 11*a* and 11*b* is, for example, 10 kHz. The frequency of the voltage applied to the electrodes 12*a* and 12*b* is, for example, 6 MHz. The magnitude of the voltage applied to the electrodes 11*a* and 11*b* is, for example, 70 Vpp. The magnitude of the voltage applied to the electrodes 12*a* and 12*b* is, for example, 10 Vpp.

An inhomogeneous electric field is made at the frequency of 10 kHz between the electrodes 11*a* and 11*b*. An inhomogeneous electric field is made at the frequency of 6 MHz between the electrodes 12*a* and 12*b*. In the present embodiment, the voltage is applied to the electrodes 12*a* and 12*b* so that a positive dielectrophoretic force affects a fluid including the microparticle, for example. In the inhomogeneous electric field with the frequency of 10 kHz, the rotavirus is affected due to a positive dielectrophoretic force, for example, and is trapped around the opening 8*a*. In the inhomogeneous electric field with the frequency of 10 kHz, the HL-60 cell is affected due to the negative dielectrophoretic force, for example, and tends not to be trapped around the opening 8*a*. In the inhomogeneous electric field with the frequency of 6 MHz, the rotavirus is affected due to the negative dielectrophoretic force, for example, and tends not to be trapped around the opening 8*b*. In the inhomogeneous electric field with the frequency of 6 MHz, the HL-60 cell is affected due to the positive dielectrophoretic force, for example, and is trapped around the opening 8*b*. In the present embodiment, the frequency of the alternating-current voltage applied to the electrodes 11*a* and 11*b* and the electrodes 12*a* and 12*b* is different for each virus, the virus to be trapped differs for each of the openings 8*a* and 8*b*.

In the fifth embodiment, the same analysis as that of the first embodiment is performed using the same microparticle analysis device AD1 as that of the first embodiment, for example. The microparticle trapped by the openings 8*a* and 8*b* is irradiated with the light L1, and the light F1 emitted from the microparticle is detected. The light F1 includes, for example, fluorescence. In the present embodiment, fluorescence derived from the rotavirus is observed around the opening 8*a*, and fluorescence derived from the HL-60 cells is observed around the opening 8*b*.

Sixth Embodiment

Figure 16:
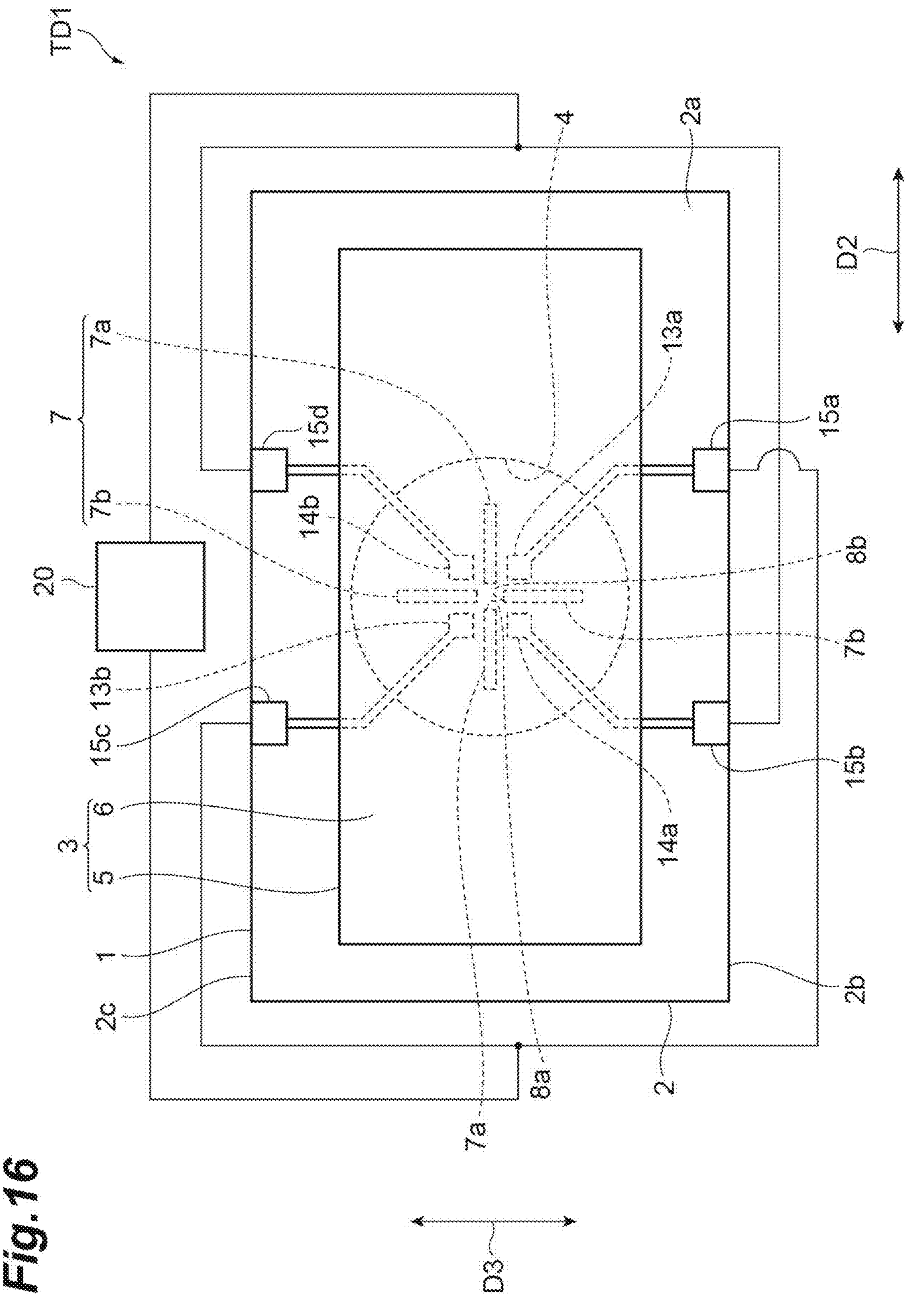
FIG. 16 is a schematic view illustrating a configuration of a microparticle analysis device according to a sixth embodiment.
Figure 17:
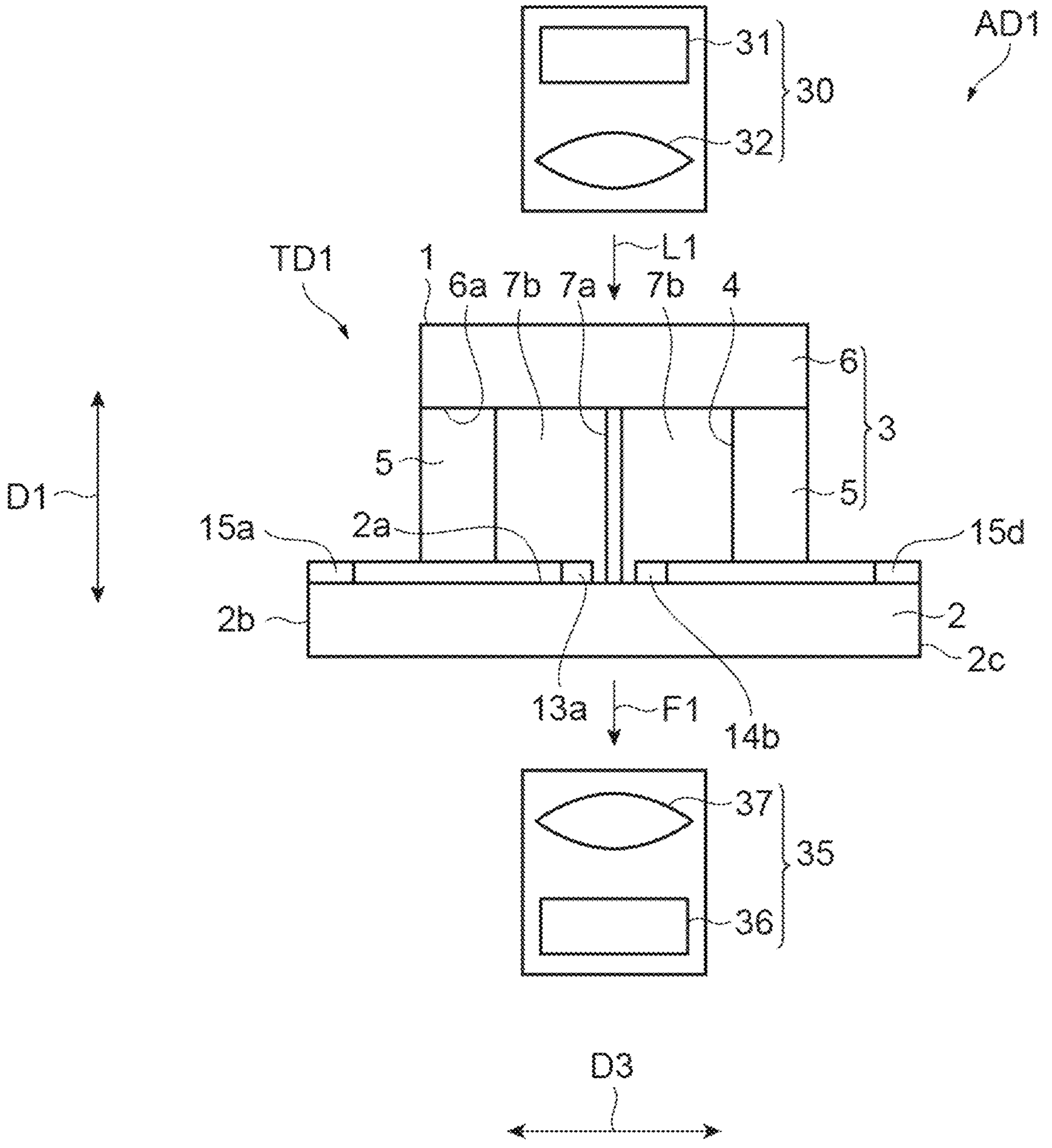
FIG. 17 is a schematic view illustrating a cross-sectional configuration of the microparticle analysis device according to the sixth embodiment.

The configuration of the microparticle analysis device according to the sixth embodiment will be described with reference to FIGS. 16 and 17. FIG. 16 is a schematic view illustrating the configuration of the microparticle analysis device according to the sixth embodiment when viewed in the first direction. FIG. 17 is a schematic view illustrating a cross-sectional configuration of the microparticle analysis device according to the sixth embodiment when viewed in the third direction. A microparticle analysis device AD1 includes a microparticle trapping device TD1.

The configuration of the microparticle trapping device TD1 will be described. The microparticle trapping device TD1 includes a housing 1 and a plurality of electrodes 13*a*, 13*b*, 14*a*, and 14*b*. In the present embodiment, the microparticle trapping device TD1 includes the four electrodes 13*a*, 13*b*, 14*a*, and 14*b*. The housing 1 includes a base 2 and a wall 3. The base 2 and the wall 3 are arranged in a first direction D1. The base 2 and the wall 3 are coupled to each other. In the housing 1, the fluid channel 4 is defined inside the base 2 and the wall 3. The fluid channel 4 is defined by the housing 1. In the present embodiment, the fluid channel 4 is a liquid channel surrounded with the base 2 and the wall 3. The base 2 and the wall 3 define the fluid channel 4. A fluid including the microparticle is injected into the fluid channel 4. The base 2 and the wall 3 are formed separately from each other, for example. The base 2 and the wall 3 are bonded to each other with an adhesive, for example. The base 2 and the wall 3 may be integrally formed with each other.

The base 2 includes, for example, an insulating material. The insulating material of the base 2 includes, for example, glass. A thickness of the base 2 is, for example, 1 mm. A length of the base 2 in the second direction D2 is, for example, 38 mm. A length of the base 2 in the third direction D3 is, for example, 26 mm.

The wall 3 includes a side wall 5 and an upper wall 6. The side wall 5 and the upper wall 6 are coupled to each other. The side wall 5 surrounds, for example, the fluid channel 4 when viewed in the first direction D1. The upper wall 6 is opposed to the base 2 in the first direction D1. The base 2, the side wall 5, and the upper wall 6 surround the fluid channel 4 when viewed in the second direction D2. The side wall 5 and the upper wall 6 are formed separately from each other, for example. The side wall 5 and the upper wall 6 are bonded to each other with an adhesive, for example. The side wall 5 and the upper wall 6 may be integrally formed with each other. The side wall 5 and the upper wall 6 include, for example, an insulating material. The insulating material of the side wall 5 and the upper wall 6 includes, for example, silicone rubber.

The fluid channel 4 has, for example, a circular shape when viewed in the first direction D1. A length of the fluid channel 4 in the first direction D1 is, for example, 50 μm. In a case where the fluid channel 4 has a circular shape, a diameter of the fluid channel 4 is, for example, 15 mm. The fluid channel 4 may have an elliptical shape or a rectangular shape when viewed in the first direction D1.

A partition wall 7 is disposed on the wall 3. The partition wall 7 includes, for example, two partition walls 7*a* and 7*b*. Of the two partition walls 7*a* and 7*b*, the partition wall 7*a* is disposed, for example, in the second direction D2. The partition wall 7*b* is disposed, for example, in the third direction D3. The partition walls 7*a* and 7*b* is disposed between the upper wall 6 and the base 2 in the first direction D1.

The partition walls 7*a* and 7*b* are in contact with, for example, the upper wall 6. The partition walls 7*a* and 7*b* are integrally formed with the upper wall 6, for example. The partition walls 7*a* and 7*b* may be formed separately from the upper wall 6. In a case where the partition walls 7*a* and 7*b* and the upper wall 6 are formed separately, the partition walls 7*a* and 7*b* and the upper wall 6 are bonded to each other with an adhesive, for example. The partition walls 7*a* and 7*b* are in contact with the base 2, for example. In a case where the partition walls 7*a* and 7*b* and the base 2 are formed separately, the partition walls 7*a* and 7*b* are bonded to the base 2 with an adhesive, for example. The partition walls 7*a* and 7*b* may be integrally formed with the base 2. The partition walls 7*a* and 7*b* may be in contact with the upper wall 6, for example, and may not be in contact with the base 2. The partition walls 7*a* and 7*b* may be in contact with the base 2, for example, and may not be in contact with the upper wall 6. The partition walls 7*a* and 7*b* are in contact with at least one of the upper wall 6 and the base 2. In the present embodiment, the partition walls 7*a* and 7*b* are separated from the side wall 5. The partition walls 7*a* and 7*b* may be in contact with the side wall 5.

The partition walls 7*a* and 7*b* divide, for example, the fluid channel 4 in four when viewed in the first direction D1. The partition walls 7*a* and 7*b* divide, for example, the fluid channel 4 into equal quarters when viewed in the first direction D1. The partition walls 7*a* and 7*b* include an insulating material. The insulating material of the partition walls 7*a* and 7*b* includes, for example, silicone rubber.

In the present embodiment, one opening 8*a* is formed in the partition wall 7*a*. Another opening 8*b* is formed in the partition wall 7*b*. The openings 8*a* and 8*b* have, for example, a slit shape. The slit-shaped openings 8*a* and 8*b* are formed in the first direction D1. The openings 8*a* and 8*b* intersect each other, for example, when viewed in the first direction D1. The openings 8*a* and 8*b* are formed between a surface 6*a* inside the upper wall 6 and a surface 2*a* inside the base 2. The openings 8*a* and 8*b* are formed to touch, for example, at least any one of the surface 6*a* and the surface 2*a*. The openings 8*a* and 8*b* may not formed to touch either the surface 6*a* or the surface 2*a*. The openings 8*a* and 8*b* have, for example, a circular shape. The openings 8*a* and 8*b* are positioned in the fluid of the suspension injected into the fluid channel 4. The configurations of the openings 8*a* and 8*b* when viewed in the first direction D1 are, for example, the same as the configuration of the opening 8 according to the first embodiment when viewed in the first direction D1.

The electrodes 13*a*, 13*b*, 14*a*, and 14*b* are disposed on the surface 2*a*. In the present embodiment, the electrodes 13*a*, 13*b*, 14*a*, and 14*b* include quadrupole electrodes. The quadrupole electrodes include, for example, the electrodes 13*a* and 13*b* having the same polarity as each other and the electrodes 14*a* and 14*b* having the same polarity as each other. In a case where a voltage is applied, the polarity of the electrodes 13*a* and 13*b* and the polarity of the electrodes 14*a* and 14*b* are different from each other. The electrodes 13*a* and 13*b* and the electrodes 14*a* and 14*b* are disposed in the fluid channel 4. For example, in a case where the electrode 13*a* constitutes the first electrode, the electrode 14*a* constitutes the second electrode. In a case where the electrode 13*a* constitutes the first electrode, the electrode 14*b* may constitute the second electrode. For example, in a case where the electrode 13*b* constitutes the first electrode, the electrode 14*a* constitutes the second electrode. In a case where the electrode 13*b* constitutes the first electrode, the electrode 14*b* may constitute the second electrode.

The electrodes 13*a* and 13*b* are opposed to each other in a direction intersecting the second direction D2 and the third direction D3, for example. The electrodes 14*a* and 14*b* are opposed to each other in a direction intersecting the second direction D2 and the third direction D3, for example. The direction in which the electrodes 13*a* and 13*b* are opposed to each other and the direction in which the electrodes 14*a* and 14*b* are opposed to each other intersect with each other. The electrode 13*a* is opposed to the electrode 14*a* in the second direction D2, for example. The electrode 13*a* is opposed to the electrode 14*b* in the third direction D3, for example. The electrode 13*b* is opposed to the electrode 14*b* in the second direction D2, for example. The electrode 13*b* is opposed to the electrode 14*a* in the third direction D3, for example.

The electrode 13*a* and the electrode 14*a* are separated from each other, for example, in the second direction D2. An interval between the electrode 13*a* and the electrode 14*a* in the second direction D2 is, for example, 300 μm. The electrode 13*a* and the electrode 14*b* are separated in the third direction D3. An interval between the electrode 13*a* and the electrode 14*b* in the third direction D3 is, for example, 300 μm. The electrode 13*b* and the electrode 14*b* are separated in the second direction D2. An interval between the electrode 13*b* and the electrode 14*b* in the second direction D2 is, for example, 300 μm. The electrode 13*b* and the electrode 14*a* are separated in the third direction D3. An interval between the electrode 13*b* and the electrode 14*a* in the third direction D3 is, for example, 300 μm. The electrodes 13*a*, 13*b*, 14*a*, and 14*b* include, for example, a metal film. The metal film includes, for example, aluminum. The metal film is formed through, for example, a vapor deposition method. Thicknesses of the electrodes 13*a*, 13*b*, 14*a*, and 14*b* are, for example, 100 nm.

For example, four relay electrodes 15*a*, 15*b*, 15*c*, and 15*d* are disposed on the surface 2*a*. The relay electrodes 15*a*, 15*b*, 15*c*, and 15*d* are positioned outside the fluid channel 4. For example, the relay electrodes 15*a* and 15*b* are disposed at an end edge 2*b*, and the relay electrodes 15*c* and 15*d* are disposed at an end edge 2*c*. The end edges 2*b* and 2*c* define both ends of the base 2 in the third direction D3. For example, the electrode 13*a* is connected to the relay electrode 15*a*, and the electrode 13*b* is connected to the relay electrode 15*c*. For example, the electrode 14*a* is connected to the relay electrode 15*b*, and the electrode 14*b* is connected to the relay electrode 15*d*.

For example, the electrode 13*a* is electrically connected to the control unit 20 via a relay electrode 15*a*, and the electrode 13*b* is electrically connected to the control unit 20 via a relay electrode 15*c*. For example, the electrode 14*a* is electrically connected to the control unit 20 via a relay electrode 15*b*, and the electrode 14*b* is electrically connected to the control unit 20 via a relay electrode 15*d*. The control unit 20 applies a voltage to the quadrupole electrodes 13*a*, 13*b*, 14*a*, and 14*b*. The electrodes 13*a*, 13*b*, 14*a*, and 14*b* are electrically insulated from one another.

Each of the electrodes 13*a*, 13*b*, 14*a*, and 14*b* includes a surface opposed to an electrode having a polarity different from each other. These opposing surfaces each have a shape that gently protrudes from a peripheral region of the surface toward a center region, for example. The configuration having the gently protruding shape reduces concentration of the electric field on each end edge of the electrodes 13*a*, 13*b*, 14*a*, and 14*b*. Each of the electrodes 13*a*, 13*b*, 14*a*, and 14*b* may include a surface in a hyperbolic curve, for example, when viewed in the first direction D1. The configuration in a hyperbolic curve also reduces concentration of the electric field on each end edge of the electrodes 13*a*, 13*b*, 14*a*, and 14*b*. In the present embodiment, the electric field may be generated with a multipole other than the quadrupole. The electric field may be generated with, for example, a three-pole, five-pole, or six-pole (hexapole) electrode.

Due to an application of the voltage from the control unit 20, an electric field is generated between the electrode 13*a* and at least one of the electrodes 14*a* and 14*b*. Due to an application of the voltage from the control unit 20, an electric field is generated between the electrode 13*b* and at least one of the electrodes 14*a* and 14*b*. Opening widths of the openings 8*a* and 8*b* are smaller than the sum of the lengths of the electrodes 13*a*, 13*b*, 14*a*, and 14*b* in the second direction D2 and the lengths of the electrodes 13*a*, 13*b*, 14*a*, and 14*b* in the third direction D3. The openings 8*a* and 8*b* cause an electric field to pass through. The partition walls 7*a* and 7*b* excluding the openings 8*a* and 8*b* block the penetration of the electric field. The electric fields generated at the electrodes 13*a*, 13*b*, 14*a*, and 14*b* are concentrated around the openings 8*a* and 8*b*. As a result, an inhomogeneous electric field is made between the electrode 13*a* and at least one of the electrodes 14*a* and 14*b*. The inhomogeneous electric field is made between the electrode 13*b* and at least one of the electrode 14*a* and the electrode 14*b*. The inhomogeneous electric field is made among the electrodes 13*a*, 13*b*, 14*a*, and 14*b* in the fluid channel 4.

The opening widths of the openings 8*a* and 8*b* have a size with which the electric flux density is increased so that the microparticle is trapped around the openings 8*a* and 8*b*. In the present embodiment, the opening widths of the openings 8*a* and 8*b* are, for example, 5 μm. Thicknesses of the partition walls 7*a* and 7*b* excluding the end portions defining the openings 8*a* and 8*b* are, for example, 50 μm.

Figure 18:
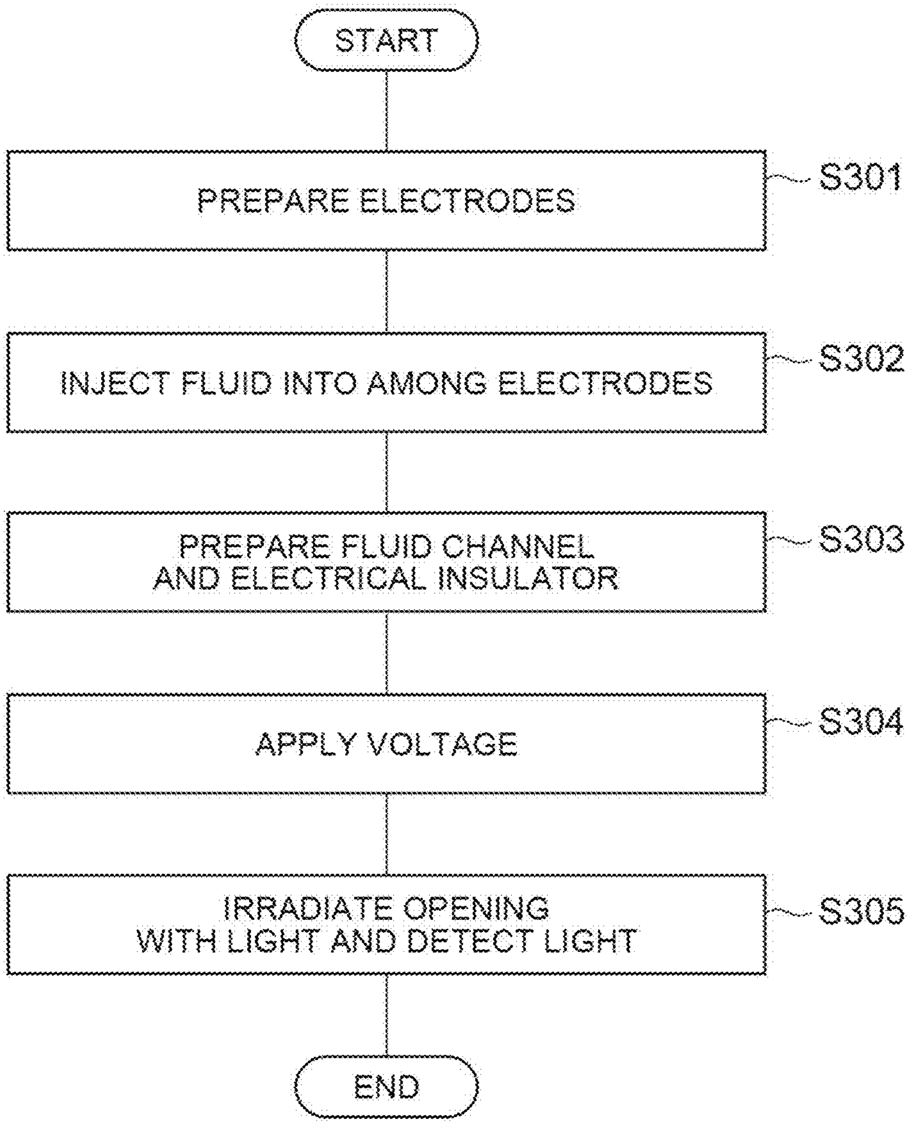
FIG. 18 is a flowchart illustrating a microparticle analysis method according to the sixth embodiment.

The microparticle analysis method according to the sixth embodiment will be described with reference to FIG. 18. FIG. 18 is a flowchart illustrating a microparticle analysis method according to the sixth embodiment. In the present embodiment, the microparticle analysis method includes a microparticle trapping method. The configuration of the microparticle analysis device AD1 of the present embodiment is the same as the configuration of the microparticle analysis device AD1 according to the first embodiment, for example, except for the microparticle trapping device TD1.

The microparticle trapping method will be described. In the microparticle trapping method, first, the electrodes 13*a*, 13*b*, 14*a*, and 14*b* are prepared (S301). In the present embodiment, the electrodes 13*a*, 13*b*, 14*a*, and 14*b* are disposed on the surface 2*a*.

Next, a fluid including the microparticle is injected among the electrodes 13*a*, 13*b*, 14*a*, and 14*b* (S302). In the present embodiment, a suspension including the microparticle is injected among the electrodes 13*a*, 13*b*, 14*a*, and 14*b* to come into contact with the electrodes 13*a*, 13*b*, 14*a*, and 14*b*. The suspension is injected among the electrodes 13*a*, 13*b*, 14*a*, and 14*b*, i.e. in the region surrounded with the electrodes 13*a*, 13*b*, 14*a*, and 14*b*. The suspension is, for example, sucked into a dropper and then dropped from the dropper into the region described above. The suspension includes, for example, a virus suspension. The virus suspension is prepared due to suspending rotavirus in ultrapure water. The rotavirus is fluorescently labeled with a fluorescent dye, for example. The fluorescent dye includes, for example, Alexa Fluor (registered trademark) 488 5-TFP. A concentration of the rotavirus in the suspension is, for example, 300 ng/mL. An outer diameter of the rotavirus is, for example, 100 nm. After the suspension is prepared, the suspension is injected among the electrodes 13*a*, 13*b*, 14*a*, and 14*b*.

After injection of the virus suspension, the fluid channel 4 and the partition wall 7 are prepared (S303). In the present embodiment, the fluid channel 4 is defined by the housing 1. The housing 1 includes a base 2 and a wall 3. For example, the electrodes 13*a*, 13*b*, 14*a*, and 14*b* are disposed in the base 2, and the partition wall 7 is disposed on the wall 3. The wall 3 is disposed in the housing 1 such that at least one of openings 8*a* and 8*b* is positioned in partition wall 7 in a fluid including the microparticle, for example. The base 2 and the wall 3 are coupled to each other, for example, and the fluid channel 4 is defined inside the base 2 and the wall 3. A virus suspension is injected into the fluid channel 4.

In the present embodiment, after the fluid channel 4 and the partition wall 7 are prepared, an alternating-current voltage is applied to the electrodes 13*a*, 13*b*, 14*a*, and 14*b* (S304). The alternating-current voltage is applied so that the inhomogeneous electric field is made through the at least one of the openings 8*a* and 8*b* among the electrodes 13*a*, 13*b*, 14*a*, and 14*b* in the fluid channel 4. A frequency of the applied voltage is, for example, 1 MHz. A magnitude of the applied voltage is, for example, 70 Vpp. In the present embodiment, a voltage is applied to the electrodes 13*a*, 13*b*, 14*a*, and 14*b* so that a positive dielectrophoretic force affect the fluid including the microparticle. The rotavirus in the suspension is affected due to a positive dielectrophoretic force, for example, and is trapped around the openings 8*a* and 8*b*.

The microparticle analysis method will be described. In the microparticle analysis method, the openings 8*a* and 8*b* are irradiated with light and the light irradiated around the openings 8*a* and 8*b* is detected (S305). In the microparticle analysis method, the rotavirus trapped around the openings 8*a* and 8*b* is irradiated with the light L1. The light irradiation unit 30 is driven, and the rotavirus trapped around the openings 8*a* and 8*b* is irradiated with the light L1. The light detection unit 35 is driven, and the light F1 emitted from the rotavirus is detected. The light F1 includes, for example, fluorescence. The fluid including the microparticle may be a suspension other than the suspension in which rotavirus is included in ultrapure water. The fluid including the microparticle includes, for example, a suspension including polystyrene bead or a suspension including tobacco mosaic virus (TMV) and herpes simplex virus type 1 (HSV).

Effects of the present embodiments will be described. Hereinafter, the sixth embodiment will be mainly described. Embodiments other than the sixth embodiment also have similar effects in the corresponding configuration and method.

The method for trapping the microparticle through dielectrophoresis includes: preparing the fluid channel 4, the electrodes 13*a*, 13*b*, 14*a*, and 14*b* configured to generate the electric field in the fluid channel 4, and the partition wall 7 formed with the at least one opening 8*a* and 8*b* among the electrodes 13*a*, 13*b*, 14*a*, and 14*b* in the fluid channel 4; injecting the fluid including microparticle into the fluid channel 4; and applying the voltage to the electrodes 13*a*, 13*b*, 14*a*, and 14*b* so that the inhomogeneous electric field is made through the at least one of the openings 8*a* and 8*b* among the electrodes 13*a*, 13*b*, 14*a*, and 14*b* in the fluid channel 4.

In the method for trapping the microparticle, the inhomogeneous electric field is made through the at least one of the openings 8*a* and 8*b* among the electrodes 13*a*, 13*b*, 14*a*, and 14*b* in the fluid channel 4, and the electric field is concentrated around the openings 8*a* and 8*b*. Therefore, the viruses of the microparticle included in the fluid injected into the fluid channel 4 are affected due to the dielectrophoretic force and are trapped around the openings 8*a* and 8*b*. The microparticle trapping method densely traps the microparticles from a fluid.

In the method for trapping the microparticle, the preparing step includes preparing the housing 1 for the fluid channel 4. The housing 1 includes the base 2 and the wall 3 defining the fluid channel 4 with the base 2, the electrodes 13*a*, 13*b*, 14*a*, and 14*b* are disposed on the base 2, and the partition wall 7 is disposed on the wall 3. The injecting step includes injecting the fluid including the microparticle into the fluid channel 4 so that the particle comes in contact with the electrodes 13*a*, 13*b*, 14*a*, and 14*b*, and disposing the wall 3 on the base 2 so that the at least one of openings 8*a* and 8*b* is positioned in the fluid including the microparticle Therefore, the fluid channel 4 is defined such that the at least one of the openings 8*a* and 8*b* is positioned in the fluid after the fluid including the microparticle is injected into the fluid channel, the microparticle included in the fluid is trapped around the opening due to the application of the voltage to the electrodes 13*a*, 13*b*, 14*a*, and 14*b*.

In the method for trapping the microparticle, the applying step includes applying the voltage to the electrodes 13*a*, 13*b*, 14*a*, and 14*b* to exert the positive dielectrophoretic force on the fluid including the microparticle Therefore, the microparticle in the fluid is reliably trapped around the openings 8*a* and 8*b*

The method for analyzing the microparticle includes: trapping the microparticle through the method for trapping the microparticle; irradiating the trapped microparticle with the light L1; and detecting the light F1 from the microparticle, the light F1 being emitted due to the irradiation to the microparticle with the light L1.

Therefore, the densely trapped microparticles around the openings 8*a* and 8*b* are irradiated with the light L1, and the amount of the light F1 from the microparticle is increased. In the present embodiment, the microparticle is trapped around the openings 8*a* and 8*b* separated from the electrodes 13*a*, 13*b*, 14*a*, and 14*b*, and the light L1 with which the light irradiation unit 30 irradiates the microparticle and the light F1 from the microparticle tend not to be shielded with the electrodes 13*a*, 13*b*, 14*a*, and 14*b*. As a result, the electrodes 13*a*, 13*b*, 14*a*, and 14*b* may not include a transparent electrode, which is expensive, and the microparticle analysis method is performed at low cost.

In the method for analyzing the microparticle, the trapping step includes preparing the partition wall 7 transparent to the light L1 and the light F1.

Therefore, the amount of the light F1 from the microparticle is further increased.

In the method for analyzing the microparticle, the detecting step includes detecting fluorescence, the fluorescence being emitted due to the irradiation with the first light.

The microparticle trapping device TD1 includes: the fluid channel 4 configured to be injected with the fluid including the microparticle; the electrodes 13*a*, 13*b*, 14*a*, and 14*b* configured to generate the electric field in the fluid channel 4; and the partition wall 7 formed with at least one of the openings 8*a* and 8*b* among the electrodes 13*a*, 13*b*, 14*a*, and 14*b* in the fluid channel 4. The partition wall 7 is disposed among the electrodes 13*a*, 13*b*, 14*a*, and 14*b* so that the inhomogeneous electric field is made through the at least one of the openings 8*a* and 8*b* among the electrodes 13*a*, 13*b*, 14*a*, and 14*b* in the fluid channel 4, and the microparticle trapping device TD1 is configured to trap the microparticle through dielectrophoresis.

In the present embodiment, the inhomogeneous electric field is made through the at least one of the openings 8*a* and 8*b* among the electrodes 13*a*, 13*b*, 14*a*, and 14*b* in the fluid channel 4, and the electric field concentrates around the openings 8*a* and 8*b*. Therefore, through dielectrophoresis, the microparticles in the fluid channel 4 are densely trapped around the openings 8*a* and 8*b*.

In the microparticle trapping device TD1 includes the housing 1 including the base 2 and the wall 3 defining the fluid channel 4 with the base 2. The electrodes 13*a*, 13*b*, 14*a*, and 14*b* are disposed on the base 2. The partition wall 7 is disposed on the wall 3.

Therefore, the fluid including the microparticle is injected to the electrodes 13*a*, 13*b*, 14*a*, and 14*b* disposed on the base 2.

In the microparticle trapping device TD1, the electrodes 13*a*, 13*b*, 14*a*, and 14*b* are configured to apply the voltage to exert the positive dielectrophoretic force on the fluid including the microparticle.

Therefore, the microparticle in the fluid is reliably trapped around the openings 8*a* and 8*b*.

The microparticle analysis device AD1 includes the microparticle trapping device TD1, the light irradiation unit 30 configured to irradiate the microparticle trapped around the openings 8*a* and 8*b* with the light L1, and the light detection unit 35 configured to detect the light F1 from the microparticle, the light F1 being emitted due to the irradiation to the microparticle with the light L1.

Therefore, the microparticle trapped around the openings 8*a* and 8*b* is irradiated with the light L1, and the amount of the light F1 from the microparticle is increased.

In the microparticle analysis device AD1, the partition wall 7 is transparent to the light L1 and the light F1.

Therefore, the amount of the light F1 from the microparticle is further increased.

In the microparticle analysis device AD1, the light detection unit 35 is configured to detect the fluorescence from the microparticle, the fluorescence being emitted due to the irradiation with the light L1.

The embodiments of the present invention have been described so far, the present invention is not necessarily limited to the above-described embodiments, and various changes can be made without departing from the gist of the present invention.

In each of the above-described embodiments, the partition wall 7 may not be transparent to the first light and the second light, the first light being irradiated around the opening, and the second light being emitted from the microparticle. In the configuration in which the partition wall 7 is transparent to the first light and the second light as described above, the second light is detected more efficiently in the microparticle analysis method and the microparticle analysis device AD1.

In the description of each of the embodiments described above, the polystyrene bead, the virus, and the cell are used as a microparticle, but applicable microparticle is not limited these. The applicable microparticle other than the above-described the polystyrene bead, the virus, and the cell includes, for example, a noble metal nanoparticle, a ceramic particle, a magnetic particle, a platelet, a protein, a gelatin, a pollen, and a microorganism.

What is claimed is:

1. A method for trapping a microparticle through dielectrophoresis, the method comprising:

preparing a fluid channel, first and second electrodes configured to generate an electric field in the fluid channel, and an electrical insulator including two partition walls intersecting each other, each of the two partition walls including an opening formed in the fluid channel between the first electrode and the second electrode;

injecting a fluid including the microparticle into the fluid channel; and applying a voltage to the first and second electrodes so that an inhomogeneous electric field is made through the opening between the first and second electrodes in the fluid channel, wherein the first electrode includes a first pair of electrodes opposing each other in a first direction, the second electrode includes a second pair of electrodes opposing each other in a second direction intersecting the first direction, the preparing a fluid channel, first and second electrodes comprises preparing a housing for the fluid channel, the housing including a base and a wall defining the fluid channel with the base, the first and second electrodes being disposed on the base, the electrical insulator being disposed on the wall, preparing the two partition walls to form four divisions in the fluid channel, and four electrodes including the first pair of electrodes and the second pair of electrodes, each of the four electrodes being disposed at one of the four divisions, and the injecting a fluid comprises injecting the fluid including the microparticle into the fluid channel so that the microparticle comes in contact with the four electrodes, and disposing the wall on the base so that the opening is positioned in the fluid including the microparticle.

2. A method for analyzing a microparticle, the method comprising:

trapping the microparticle through the method according to claim 1;

irradiating the trapped microparticle with first light; and detecting second light from the microparticle, the second light being emitted due to irradiation to the microparticle with the first light.

3. The method according to claim 2, wherein the trapping the microparticle comprises preparing the electrical insulator transparent to the first light and the second light.

4. The method according to claim 2, wherein the detecting second light comprises detecting fluorescence from the microparticle, the fluorescence being emitted due to the irradiation with the first light.

5. A microparticle trapping device, comprising:

a fluid channel configured to be injected with a fluid including a microparticle;

first and second electrodes configured to generate an electric field in the fluid channel;

an electrical insulator including two partition walls intersecting each other, each of the two partition walls including an opening formed in the fluid channel between the first electrode and the second electrode; and a housing including a base and a wall defining the fluid channel with the base, the first and second electrodes being disposed on the base, the electrical insulator being disposed on the wall, wherein the first electrode includes a first pair of electrodes opposing each other in a first direction, the second electrode includes a second pair of electrodes opposing each other in a second direction intersecting the first direction, and wherein the two partition walls form four divisions in the fluid channel, each of the four electrodes including the first pair of electrodes and the second pair of electrodes, being disposed at one of the four divisions.

6. A microparticle analysis device comprising:

the microparticle trapping device according to claim 5;

a light irradiation unit configured to irradiate the microparticle trapped around the opening with first light; and a light detection unit configured to detect second light from the microparticle, the second light being emitted due to irradiation to the microparticle with the first light.

7. The microparticle analysis device according to claim 6, wherein the electrical insulator is transparent to the first light and the second light.

8. The microparticle analysis device according to claim 6, wherein the light detection unit is configured to detect fluorescence from the microparticle, the fluorescence being emitted due to the irradiation with the first light.

* * * * *